(12) United States Patent
Yamazaki et al.

(10) Patent No.: US 9,203,102 B2
(45) Date of Patent: Dec. 1, 2015

(54) FUEL CELL

(71) Applicant: HONDA MOTOR CO., LTD., Minato-ku, Tokyo (JP)

(72) Inventors: Keiko Yamazaki, Utsunomiya (JP); Masataka Furuyama, Utsunomiya (JP); Takashi Kato, Tochigi-ken (JP); Ryo Jinba, Utsunomiya (JP); Hideaki Sumi, Utsunomiya (JP); Masataka Shibuya, Sakura (JP)

(73) Assignee: Honda Motor Co., Ltd., Tokyo (JP)

( * ) Notice: Subject to any disclaimer, the term of this patent is extended or adjusted under 35 U.S.C. 154(b) by 241 days.

(21) Appl. No.: 13/936,545

(22) Filed: Jul. 8, 2013

(65) Prior Publication Data
US 2014/0017588 A1    Jan. 16, 2014

(30) Foreign Application Priority Data

Jul. 12, 2012  (JP) .................................. 2012-156084
Jul. 2, 2013   (JP) .................................. 2013-139088

(51) Int. Cl.
*H01M 8/10*    (2006.01)
*H01M 8/02*    (2006.01)

(52) U.S. Cl.
CPC .......... *H01M 8/1006* (2013.01); *H01M 8/0273* (2013.01); *H01M 8/1002* (2013.01); *H01M 2008/1095* (2013.01); *Y02E 60/521* (2013.01)

(58) Field of Classification Search
CPC ................................................. H01M 8/0273
See application file for complete search history.

(56) References Cited

U.S. PATENT DOCUMENTS

2011/0136038 A1    6/2011    Ishida et al.

FOREIGN PATENT DOCUMENTS

CN    102113157 A    6/2011
JP    3242737 B2    12/2001

OTHER PUBLICATIONS

Office Action dated Apr. 22, 2015 issued over the corresponding Chinese Application No. 201310290411.4 with the English translation of pertinent portion.

*Primary Examiner* — Jane Rhee
(74) *Attorney, Agent, or Firm* — Carrier Blackman & Associates, P.C.; Joseph P. Carrier; Fulchand P. Shende

(57) ABSTRACT

A membrane electrode assembly of a fuel cell includes a solid polymer electrolyte membrane, a cathode, and an anode. The surface size of a cathode side electrode catalyst layer of the cathode is smaller than the surface size of an anode side electrode catalyst layer of the anode. An inner end of a gas impermeable film provided around the anode side electrode catalyst layer and an outer end of a cathode side electrode catalyst layer are overlapped with each other on both sides of the solid polymer electrolyte membrane.

10 Claims, 31 Drawing Sheets

FUEL CELL

CROSS-REFERENCE TO RELATED APPLICATIONS

This application is based upon and claims the benefit of priority from Japanese Patent Applications No. 2012-156084 filed on Jul. 12, 2012 and No. 2013-139088 filed on Jul. 2, 2013, the contents all of which are incorporated herein by reference.

BACKGROUND OF THE INVENTION

1. Field of the Invention

The present invention relates to a fuel cell including a membrane electrode assembly and a pair of metal separators sandwiching the metal separators. The membrane electrode assembly includes a solid polymer electrolyte membrane, a first electrode provided on one surface of the solid polymer electrolyte membrane, and a second electrode provided on the other surface of the solid polymer electrolyte membrane. The first electrode has a first electrode catalyst layer and a first gas diffusion layer, and the second electrode has a second electrode catalyst layer and a second gas diffusion layer. The surface size of the first electrode catalyst layer is smaller than the surface size of the second electrode catalyst layer.

2. Description of the Related Art

For example, a solid polymer electrolyte fuel cell employs a solid polymer electrolyte membrane. The solid polymer electrolyte membrane is a polymer ion exchange membrane, and interposed between an anode and a cathode to form a membrane electrode assembly (MEA). The membrane electrode assembly and a pair of separators sandwiching the membrane electrode assembly make up a power generation cell for generating electricity. In use, typically, a plurality of the power generation cells are stacked together to form a fuel cell stack, and the fuel cell stack is, e.g., mounted in a vehicle for use as a fuel cell system.

In some cases, the membrane electrode assembly adopts structure where the surface size of one of the electrodes is smaller than the surface size of the solid polymer electrolyte membrane, and the surface size of the other of the electrodes is the same as, or smaller than the surface size of the solid polymer electrolyte membrane, and larger than the surface size of the one of the electrodes (stepped-type MEA).

For example, in a fuel cell disclosed in Japanese Patent No. 3242737, as shown in FIG. 31, an electrode 2 is provided on one surface of an electrolyte membrane 1, and an electrode 3 is provided on the other surface of the electrolyte membrane 1. The surface size of the electrode 2 is smaller than the surface size of the electrode 3. At the outer end of the electrolyte membrane 1, a spacer 4 is provided around the electrode 2, and a spacer 5 is provided around the electrode 3.

The electrodes 2, 3 have different surface areas. Further, ends of the electrodes 2, 3 are not positioned symmetrically with respect to the electrolyte membrane 1. Therefore, according to the disclosure, in the peripheral areas of the electrodes 2 and 3, any of the electrodes 2 and 3 supports the electrolyte membrane 1, and improvement in the mechanical strength in the peripheral areas is achieved.

SUMMARY OF THE INVENTION

In the fuel cell, the surface size of the electrode 2 is smaller than the electrode 3. Therefore, there is a so-called semi-electrode area where the catalyst layer of the electrode 3 is only provided in the outer portion of the electrolyte membrane 1. Consequently, the area extending from an outer end of the electrode to a position adjacent to the semi-electrode area tends to have a high potential or potential gradient. In particular, in the case where metal separators are used, metal ions may be dissolved from the outer ends of the metal separator facing the position adjacent to the semi-electrode area. Thus, portion of the electrolyte membrane 1 facing the outer ends of the metal separators tends to be damaged by the dissolved metal ions.

The present invention has been made to solve the problems of this type, and an object of the present invention is to provide a fuel cell having simple and economical structure in which it is possible to prevent dissolution of metal ions from metal separators, and suppress degradation of solid polymer electrolyte membranes as much as possible.

The present invention relates to a fuel cell including a membrane electrode assembly and a pair of metal separators sandwiching the membrane electrode assembly. The membrane electrode assembly includes a solid polymer electrolyte membrane, a first electrode provided on one surface of the solid polymer electrolyte membrane, and a second electrode provided on another surface of the solid polymer electrolyte membrane. The first electrode has a first electrode catalyst layer and a first gas diffusion layer, and the second electrode has a second electrode catalyst layer and a second gas diffusion layer. A surface size of the first electrode catalyst layer is smaller than a surface size of the second electrode catalyst layer.

In the present invention, a frame shaped barrier layer is provided at least around the second electrode catalyst layer or around the first electrode catalyst layer such that an inner end of the frame shaped barrier layer contacts or is overlapped with, the second electrode catalyst layer or the first electrode catalyst layer.

In the present invention, the frame shaped barrier layer is provided at least around the first electrode catalyst layer or around the second electrode catalyst layer. The frame shaped barrier layer has electrical insulating capability. Further, it is preferable that this frame shaped barrier layer has metal ion impermeability. Therefore, even if there is a potential increase or potential gradient from a position adjacent to the end of the first electrode catalyst layer to the outer portion where only the second electrode catalyst layer is present, dissolution of the metal ions from the outer ends of the metal separators can be suppressed. Further, even if water stagnation occurs, the solid polymer electrolyte membrane can be protected suitably. Thus, with the simple and economical structure, dissolution of metal ions from the metal separators can be prevented, and degradation of the solid polymer electrolyte membrane can be prevented as much as possible.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
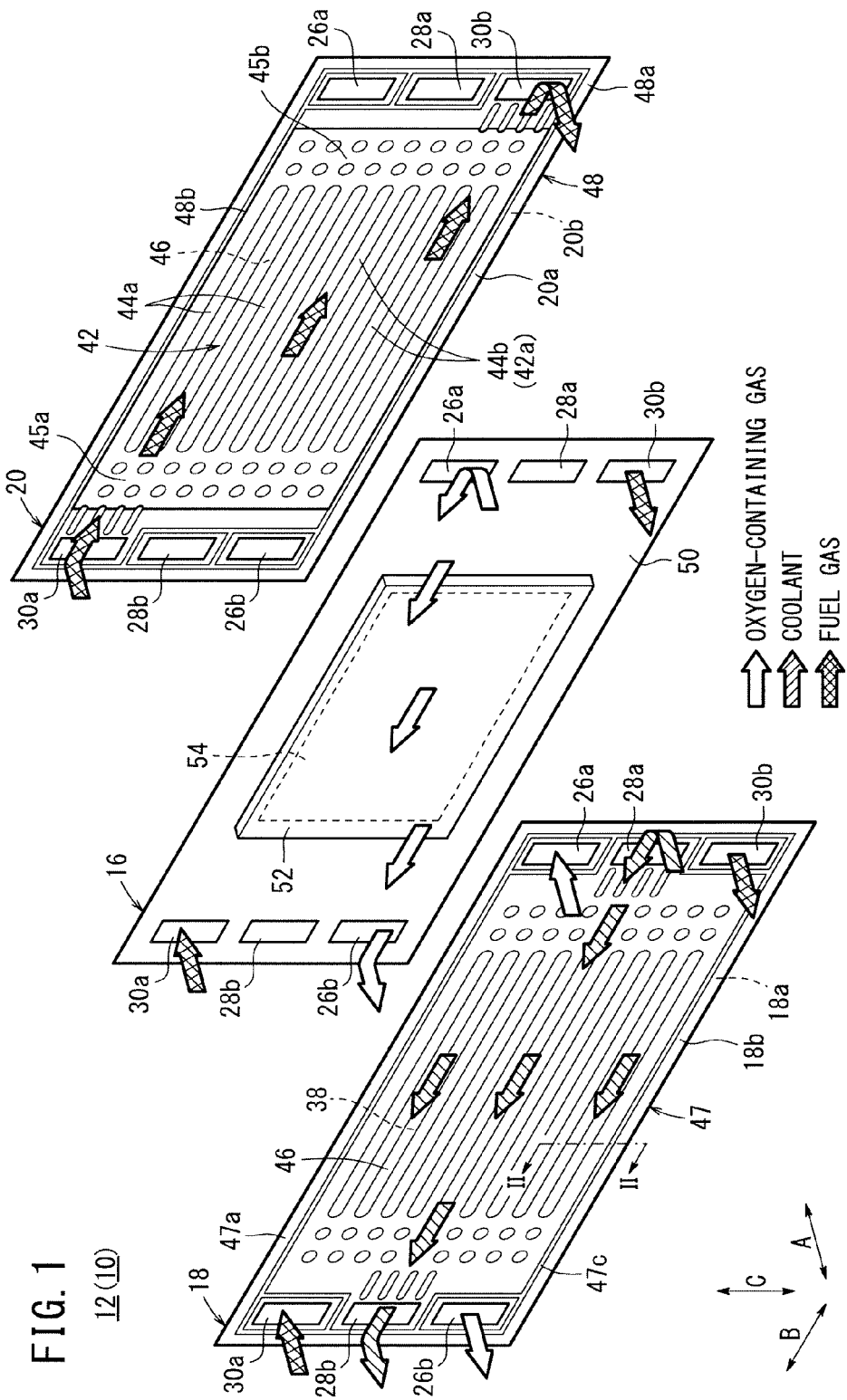
FIG. 1 is an exploded perspective view showing a power generation cell of a fuel cell according to a first embodiment of the present invention.
Figure 2:
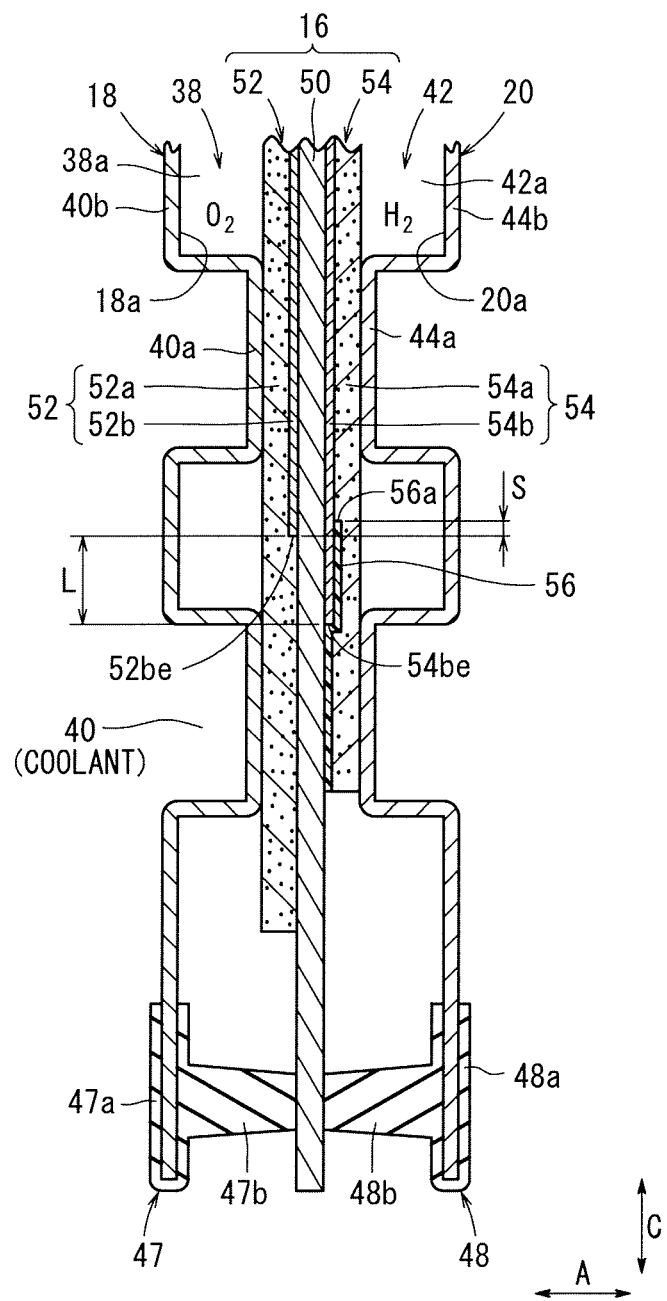
FIG. 2 is a cross sectional view showing the power generation cell taken along a line II-II in FIG. 1.

A plurality of power generation cells 12 shown in FIGS. 1 and 2 are stacked together upright in a horizontal direction indicated by an arrow A to form a fuel cell 10 according to a first embodiment of the present invention.

Each of the power generation cells 12 has a laterally elongated shape, and includes a membrane electrode assembly (MEA) 16, and a first metal separator 18 and a second metal separator 20 sandwiching the membrane electrode assembly 16. Each of the first metal separator 18 and the second metal separator 20 is formed by corrugating a metal thin plate by press forming to have a corrugated shape in cross section (see FIG. 2).

Each of the first metal separator 18 and the second metal separator 20 is made of an aluminum plate, a stainless steel plate, a titanium plate, or a niobium plate.

At one end of the power generation cell 12 in a longitudinal direction indicated by an arrow B in FIG. 1, an oxygen-containing gas supply passage 26a for supplying an oxygen-containing gas, a coolant supply passage 28a for supplying a coolant, and a fuel gas discharge passage 30b for discharging a fuel gas such as a hydrogen-containing gas are provided. The oxygen-containing gas supply passage 26a, the coolant supply passage 28a, and the fuel gas discharge passage 30b extend through the power generation cell 12 in the direction indicated by the arrow A.

At the other end of the power generation cell 12 in the longitudinal direction, a fuel gas supply passage 30a for supplying the fuel gas, a coolant discharge passage 28b for discharging the coolant, and an oxygen-containing gas discharge passage 26b for discharging the coolant are provided. The fuel gas supply passage 30a, the coolant discharge passage 28b, and the oxygen-containing gas discharge passage 26b extend through the power generation cell 12 in the direction indicated by the arrow A.

Figure 3:
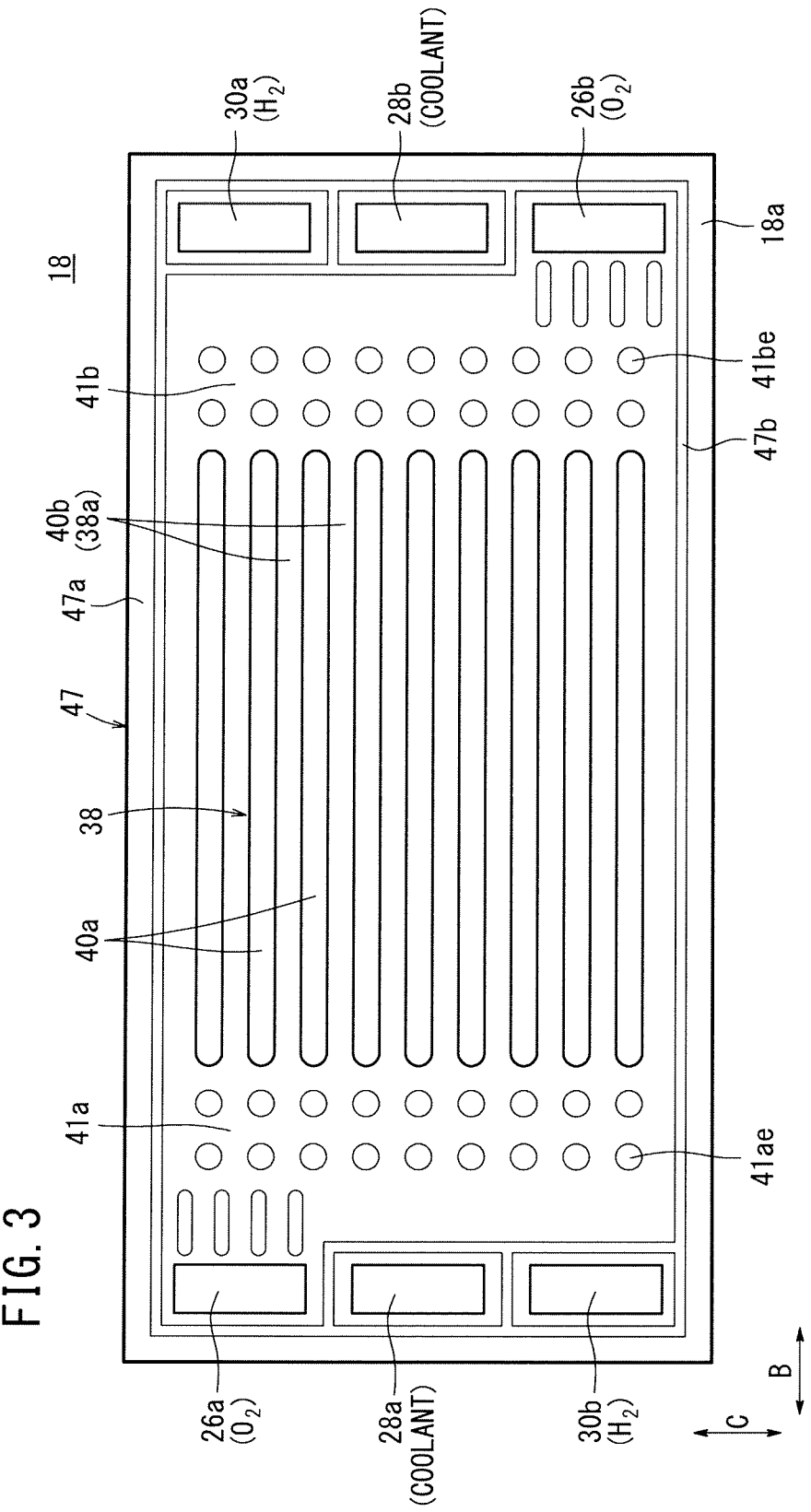
FIG. 3 is a front view showing a first metal separator of the power generation cell.

As shown in FIG. 3, the first metal separator 18 has an oxygen-containing gas flow field (reactant gas flow field) 38 on its surface 18a facing the membrane electrode assembly 16. The oxygen-containing gas flow field 38 is connected to the oxygen-containing gas supply passage 26a and the oxygen-containing gas discharge passage 26b. The oxygen-containing gas flow field 38 includes a plurality of oxygen-containing gas grooves (reactant gas flow grooves) 38a formed by protrusions 40a and recesses 40b extending in the direction indicated by an arrow B, and arranged alternately in the direction indicated by an arrow C. That is, the flow grooves 38a extend along the recesses 40b. The protrusions 40a contact the membrane electrode assembly 16, and the recesses 40b are spaced away from the membrane electrode assembly 16.

An inlet buffer 41a is provided at the inlet of the oxygen-containing gas flow field 38, and an outlet buffer 41b is provided at the outlet of the oxygen-containing gas flow field 38. A plurality of bosses 41ae protruding toward the membrane electrode assembly 16 are formed in the inlet buffer 41a, and a plurality of bosses 41be protruding toward the membrane electrode assembly 16 are formed in the outlet buffer 41b.

Figure 4:
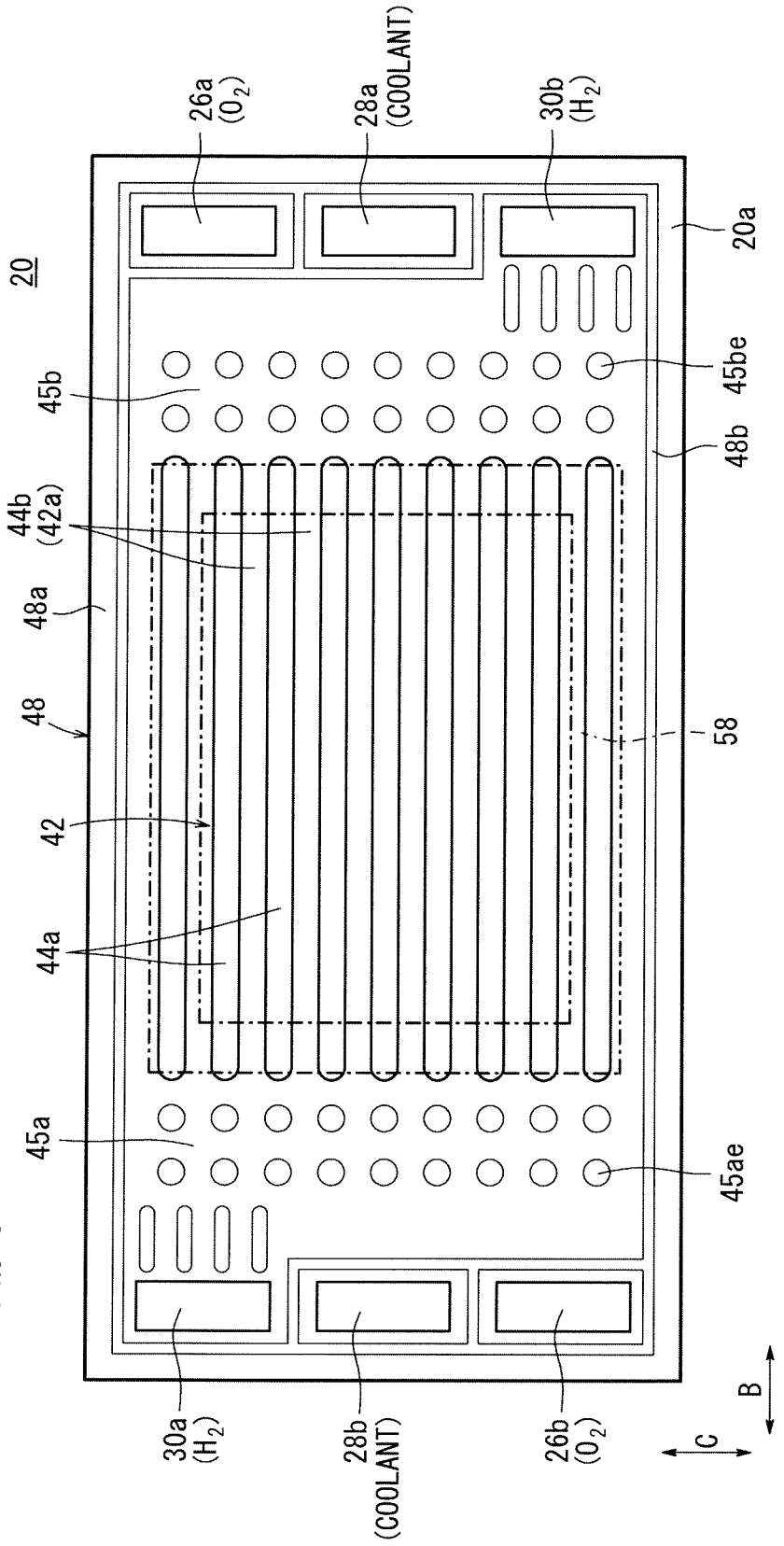
FIG. 4 is a front view showing a second metal separator of the power generation cell.

As shown in FIG. 4, the second metal separator 20 has a fuel gas flow field (reactant gas flow field) 42 on its surface 20a facing the membrane electrode assembly 16. The fuel gas flow field 42 is connected to the fuel gas supply passage 30a and the fuel gas discharge passage 30b. The fuel gas flow field 42 includes a plurality of fuel gas flow grooves (reactant gas flow grooves) 42a formed by protrusions 44a and recesses 44b extending in the direction indicated by the arrow B, and arranged alternately in the direction indicated by the arrow C. That is, the flow grooves 42a extend along the recesses 44b. The protrusions 44a contact the membrane electrode assembly 16, and the recesses 44b are spaced away from the membrane electrode assembly 16.

An inlet buffer 45a is provided at the inlet of the fuel gas flow field 42, and an outlet buffer 45b is provided at the outlet of the fuel gas flow field 42. A plurality of bosses 45ae protruding toward the membrane electrode assembly 16 are formed in the inlet buffer 45a, and a plurality of bosses 45be protruding toward the membrane electrode assembly 16 are formed in the outlet buffer 45b. The membrane electrode assembly 16 is sandwiched between the bosses 41ae, 41be, and the bosses 45be, 45ae on both sides. This is also the case with second and the subsequent embodiments described later.

As shown in FIG. 1, a coolant flow field 46 is formed between the surface 18b of the first metal separator 18 and the surface 20b of the second metal separator 20 that are adjacent to each other. The coolant flow field 46 is connected to the coolant supply passage 28a and the coolant discharge passage 28b. The coolant flow field 46 is formed by stacking the back surfaces of the oxygen-containing gas flow field 38 and the fuel gas flow field 42 together.

A first seal member 47 is formed integrally with the surfaces 18a, 18b of the first metal separator 18, around the outer end of the first metal separator 18. A second seal member 48 is formed integrally with the surfaces 20a, 20b of the second metal separator 20, around the outer end of the second metal separator 20.

Each of the first seal member 47 and the second seal members 48 is made of seal material, cushion material, or packing material such as an EPDM (ethylene propylene diene monomer) rubber, an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

As shown in FIGS. 1 and 3, the first seal member 47 includes a flat seal 47a having a uniform thickness on the surfaces 18a, 18b of the first metal separator 18. On the surface 18a, the first seal member 47 includes a ridge seal 47b protruding from the flat seal 47a, while allowing the oxygen-containing gas supply passage 26a and the oxygen-containing gas discharge passage 26b to be connected to the oxygen-containing gas flow field 38 (see FIG. 3).

On the surface 18b, the first seal member 47 includes a ridge seal 47c protruding from the flat seal 47a, while allowing the coolant supply passage 28a and the coolant discharge passage 28b to be connected to the coolant flow field 46 (see FIG. 1).

The second seal member 48 includes a flat seal 48a having a uniform thickness on the surfaces 20a, 20b of the second metal separator 20. On the surface 20a, the second seal member 48 includes a ridge seal 48b protruding from the flat seal 48a, while allowing the fuel gas supply passage 30a and the fuel gas discharge passage 30b to be connected to the fuel gas flow field 42 (see FIGS. 1 and 4).

The membrane electrode assembly 16 includes a cathode (first electrode) 52, an anode (second electrode) 54, and a solid polymer electrolyte membrane 50 interposed between the cathode 52 and the anode 54. For example, the solid polymer electrolyte membrane 50 is formed by impregnating a thin membrane of perfluorosulfonic acid with water, for example. The surface size of the solid polymer electrolyte membrane 50 is equal to, or larger than the surface sizes of the cathode 52 and the anode 54, and the outer end of the solid polymer electrolyte membrane 50 protrudes outward beyond outer ends of the cathode 52 and the anode 54.

As shown in FIG. 2, the cathode 52 includes a cathode side gas diffusion layer (first gas diffusion layer) 52a and a cathode side electrode catalyst layer (first electrode catalyst layer) 52b, and the anode 54 includes an anode side gas diffusion layer (second gas diffusion layer) 54a and an anode side electrode catalyst layer (second electrode catalyst layer) 54b. Each of the cathode side gas diffusion layer 52a and the anode side gas diffusion layer 54a comprises a carbon paper or the like. Each of the cathode side gas diffusion layer 52a and the anode side gas diffusion layer 54a comprises porous carbon particles supporting platinum alloy thereon. The carbon particles are deposited uniformly on the surfaces of the cathode side gas diffusion layer 52a and the anode side gas diffusion layer 54a.

The surface size of the cathode side electrode catalyst layer 52b is smaller than the surface size of the anode side electrode catalyst layer 54b. The outer end 52be of the cathode side electrode catalyst layer 52b is spaced inwardly from the outer end 54be of the anode side electrode catalyst layer 54b by a distance L. The surface size of the cathode side gas diffusion layer 52a is larger than the surface size of the anode side gas diffusion layer 54a. The oxygen-containing gas flow grooves 38a of the oxygen-containing gas flow field 38 are provided in the first metal separator 18 to face the outer end 52be of the cathode side electrode catalyst layer 52b. This is also the case with second and the subsequent embodiments described later.

The cathode side gas diffusion layer 52a and the anode side gas diffusion layer 54a may have the same surface size. Alternatively, the surface size of the cathode side gas diffusion layer 52a may be smaller than the surface size of the anode side gas diffusion layer 54a. This is also the case with second and the subsequent embodiments described later.

The size of the cathode 52 and the size of the anode 54 may be opposite to those described above. That is, the surface size of the cathode side electrode catalyst layer 52b may be larger than the surface size of the anode side electrode catalyst layer 54b. This is also the case with second and the subsequent embodiments described later.

Figure 5:
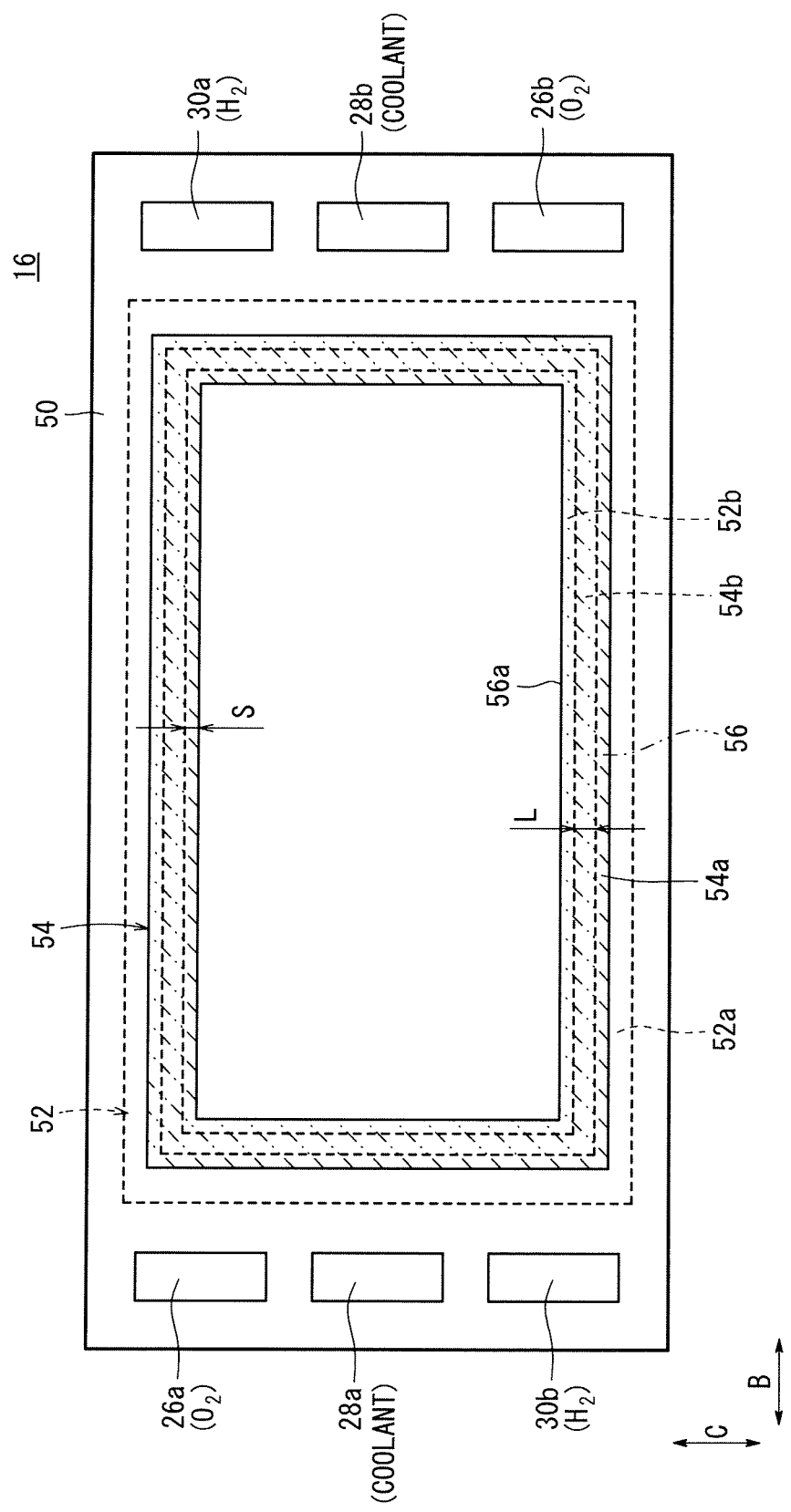
FIG. 5 is a front view showing a membrane electrode assembly of the power generation cell.

In the first embodiment, as shown in FIGS. 2 and 5, a frame shaped barrier layer such as a frame shaped gas impermeable film 56 is provided at the outer portion of the anode side electrode catalyst layer 54b. The gas impermeable film 56 has electrical insulating capability. Further, it is preferable that this gas impermeable film 56 has metal ion impermeability. The inner end 56a of the gas impermeable film 56 and at least the outer end 52be of the cathode side electrode catalyst layer 52b are overlapped with each other on both sides of the solid polymer electrolyte membrane 50 (area S in FIG. 2).

As shown in FIG. 4, in the second metal separator 20, a portion 58 which tends to have a high potential or potential gradient is present around the power generation surface.

The gas impermeable film 56 is provided from a position between the anode side electrode catalyst layer 54b and the anode side gas diffusion layer 54a to a position between the anode side gas diffusion layer 54a and the solid polymer electrolyte membrane 50 beyond the outer end 54be of the anode side electrode catalyst layer 54b.

The gas impermeable film 56 may be positioned between the anode side electrode catalyst layer 54b and the solid polymer electrolyte membrane 50. Further, the cathode 52 and the anode 54 may have sizes opposite to those described in the first embodiment, and the gas impermeable film 56 may be provided on the cathode 52 side. Also in second and the subsequent embodiments described later, the gas impermeable film can be provided on any of the cathode side and the anode side.

Material having insulating capability, hot water resistance, acid resistance, and heat resistance is used for the gas impermeable film 56. For example, PTFE (polytetrafluoroethylene), polyimide, or PEN (polyethylene naphthalate) or the like may be used for the gas impermeable film 56.

Operation of the fuel cell 10 will be described below.

As shown in FIG. 1, in the fuel cell 10, an oxygen-containing gas is supplied to the oxygen-containing gas supply passage 26a, and a fuel gas such as a hydrogen-containing gas is supplied to the fuel gas supply passage 30a. Further, a coolant such as pure water or ethylene glycol is supplied to the coolant supply passage 28a. Thus, in each of the power generation cells 12, the oxygen-containing gas, the fuel gas, and the coolant are supplied in the direction indicated by the arrow A.

As shown in FIG. 3, the oxygen-containing gas flows from the oxygen-containing gas supply passage 26a into the oxygen-containing gas flow field 38 of the first metal separator 18 to flow along the cathode 52 of the membrane electrode assembly 16 for inducing an electrochemical reaction at the cathode 52. In the meanwhile, as shown in FIGS. 1 and 4, the fuel gas flows from the fuel gas supply passage 30a into the fuel gas flow field 42 of the second metal separator 20 to flow along the anode 54 of the membrane electrode assembly 16 for inducing an electrochemical reaction at the anode 54.

Thus, in each of the membrane electrode assemblies 16, the oxygen-containing gas supplied to the cathode 52, and the fuel gas supplied to the anode 54 are partially consumed in the electrochemical reactions at the cathode side electrode catalyst layer 52b and the anode side electrode catalyst layer 54b for generating electricity.

Then, the oxygen-containing gas partially consumed at the cathode 52 is discharged into the oxygen-containing gas discharge passage 26b, and flows in the direction indicated by the arrow A. Likewise, the fuel gas partially consumed at the anode 54 is discharged into the fuel gas discharge passage 30b, and the fuel gas flows in the direction indicated by the arrow A.

Further, the coolant flows from the coolant supply passage 28a into the coolant flow field 46 between the first metal separator 18 and the second metal separator 20, and then, flows in the direction indicated by the arrow B. After the coolant cools the membrane electrode assembly 16, the coolant moves through the coolant discharge passage 28b, and is discharged from the fuel cell 10.

In the structure, the surface size of the cathode side electrode catalyst layer 52b is smaller than the surface size of the anode side electrode catalyst layer 54b. As shown in FIG. 2, the outer end 52be of the cathode side electrode catalyst layer 52b is spaced away inward from the outer end 54be of the anode side electrode catalyst layer 54b by the distance L. In the structure, the area around the electrode where only the anode side electrode catalyst layer 54b is present on only one of the surfaces of the solid polymer electrolyte membrane 50 to a position adjacent to the semi-electrode area (area indicated by the distances S to L) tends to have a high potential or potential gradient.

Therefore, in the first embodiment, as shown in FIGS. 2 and 5, the gas impermeable film 56 is provided at the outer portion of the anode side electrode catalyst layer 54b. The inner end 56a of the gas impermeable film 56 and at least the outer end 52be of the cathode side electrode catalyst layer 52b are overlapped with each other on both sides of the solid polymer electrolyte membrane 50.

Therefore, even if the area from a position adjacent to the end of the cathode side electrode catalyst layer 52b toward the outer portion where only the anode side electrode catalyst layer 54b is present has a high potential or potential gradient, dissolution of the metal ions from the outer end of the second metal separator 20 can be suppressed. Thus, with the simple and economical structure, dissolution of metal ions from the second metal separator 20 can be prevented, and degradation of the solid polymer electrolyte membrane 50 can be prevented as much as possible. Further, even if metal ions are produced, it becomes possible to prevent entry of the metal ions into the solid polymer electrolyte membrane 50.

Figure 6:
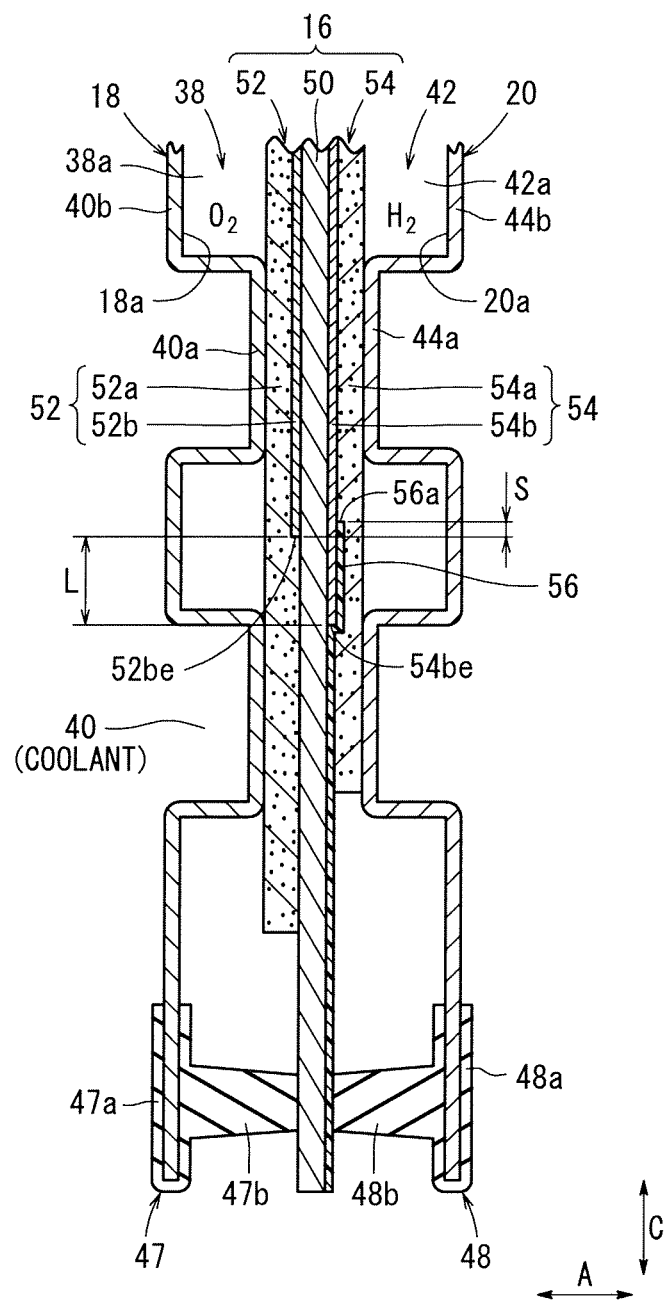
FIG. 6 is a cross sectional view showing main components of a power generation cell according to a second embodiment of the present invention.

FIG. 6 is a cross sectional view showing main components of a power generation cell 12a of a fuel cell 10a according to a second embodiment of the present invention. The constituent elements of the fuel cell 10a that are identical to those of the fuel cell 10 according to the first embodiment are labeled with the same reference numerals, and descriptions thereof will be omitted. Also in third and the subsequent embodiments as described later, the constituent elements that are identical to those of the fuel cell 10 according to the first embodiment are labeled with the same reference numerals, and descriptions thereof will be omitted.

In the second embodiment, a gas impermeable film 56 is provided, and the outer size of the gas impermeable film 56 is the same as the outer size of the solid polymer electrolyte membrane 50. Therefore, in the second embodiment, the same advantages as in the case of the first embodiment are obtained. Further, the solid polymer electrolyte membrane 50 can be protected further reliably. Further, the gas impermeable film 56 may be positioned between the anode side electrode catalyst layer 54b and the solid polymer electrolyte membrane 50.

Figure 7:
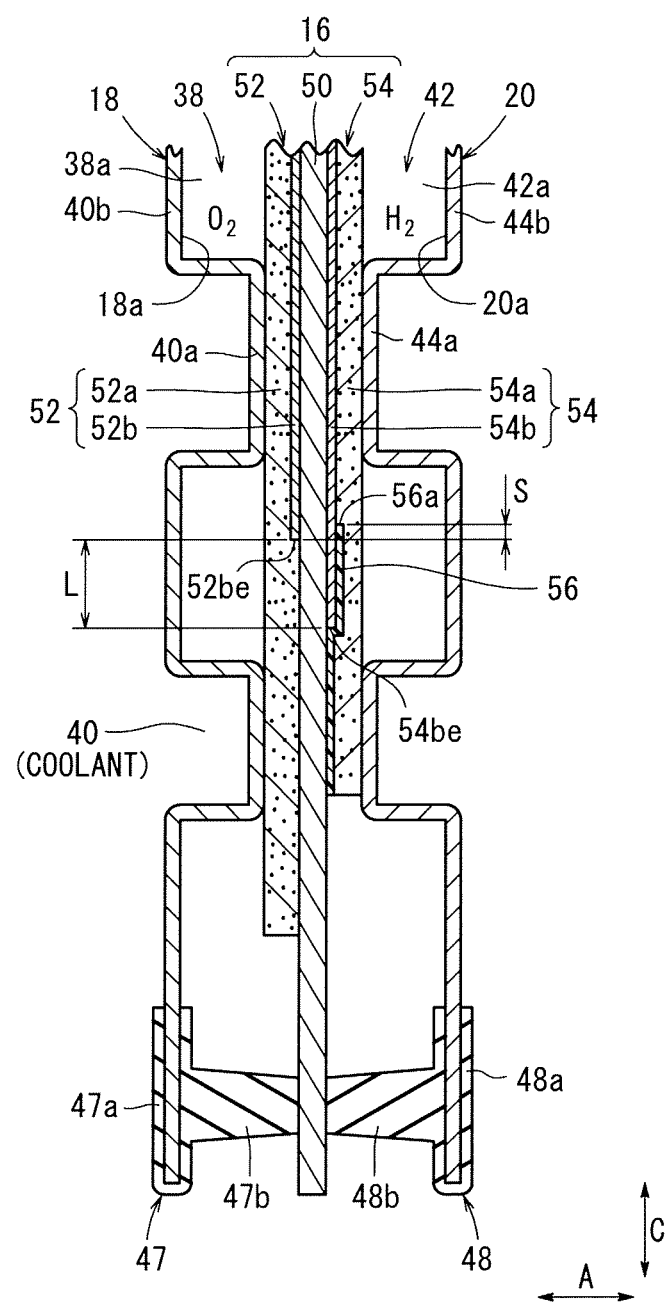
FIG. 7 is a cross sectional view showing main components of a power generation cell according to a third embodiment of the present invention.

FIG. 7 is a cross sectional view showing main components of a power generation cell 12b of a fuel cell 10b according to a third embodiment of the present invention.

In the third embodiment, a second metal separator 20 has a fuel gas flow grooves 42a of a fuel gas flow field 42 facing an outer end 54be of an anode side electrode catalyst layer 54b. Thus, at the outer end 54be of the anode side electrode catalyst layer 54b, it is possible reliably suppress stagnation of the fuel gas and the water produced in the power generation reaction.

Figure 8:
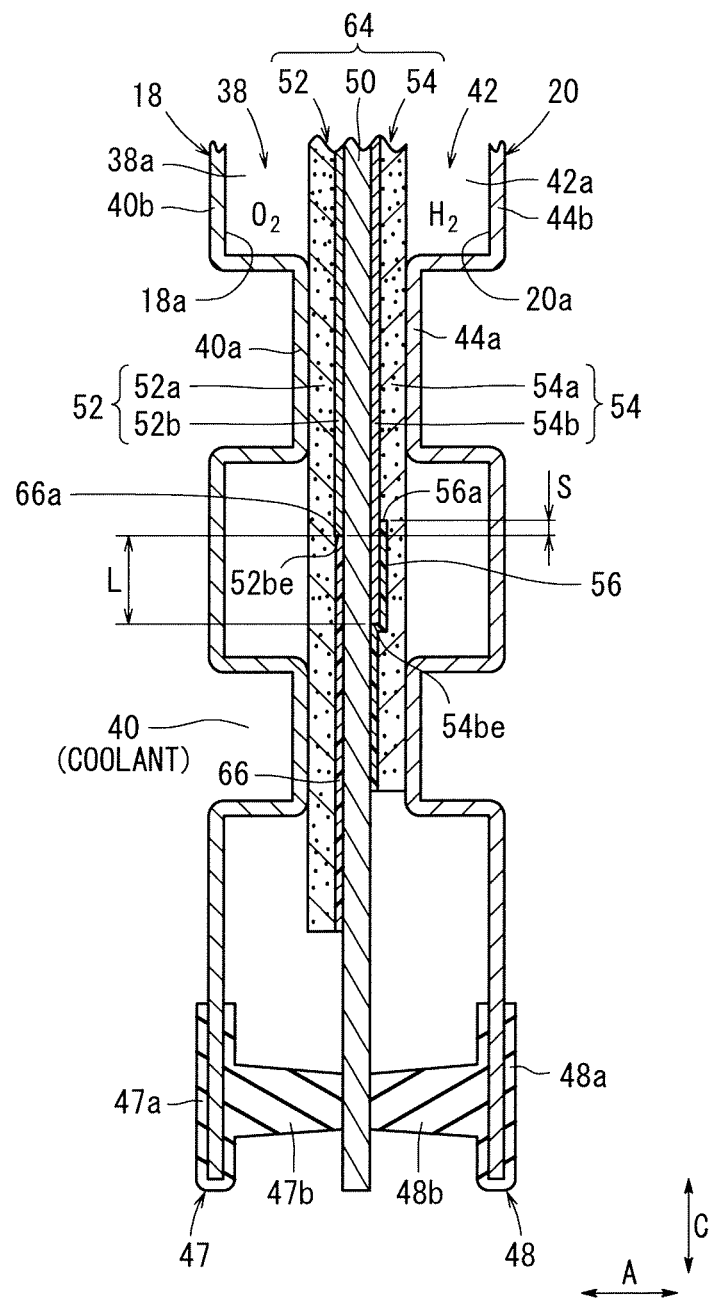
FIG. 8 is a cross sectional view showing main components of a power generation cell according to a fourth embodiment of the present invention.

FIG. 8 is a cross sectional view showing main components of a power generation cell 62 of a fuel cell 60 according to a fourth embodiment of the present invention.

The power generation cell 62 includes a membrane electrode assembly (MEA) 64, and a first metal separator 18 and a second metal separator 20 sandwiching the membrane electrode assembly 64. The membrane electrode assembly 64 includes a cathode 52, an anode 54, and a solid polymer electrolyte membrane 50 interposed between the cathode 52 and the anode 54.

A frame shaped barrier layer such as a gas impermeable film 56 is provided on the outer portion of an anode side electrode catalyst layer 54b, and a frame shaped barrier layer such as a frame shaped gas impermeable film 66 is provided around a cathode side electrode catalyst layer 52b. An inner end 66a of the gas impermeable film 66 contacts an outer end 52be of the cathode side electrode catalyst layer 52b, or the inner end 66a of the gas impermeable film 66 is positioned between the outer end 52be of the cathode side electrode catalyst layer 52b and a cathode side gas diffusion layer 52a, and the inner end 66a of the gas impermeable film 66 is partially overlapped with the outer end 52be of the cathode side electrode catalyst layer 52b.

In the fourth embodiment, the frame shaped gas impermeable film 66 is provided around the cathode side electrode catalyst layer 52b. In the structure, at the cathode 52, even if stagnant water is present around the cathode side electrode catalyst layer 52b, the solid polymer electrolyte membrane 50 can be protected suitably.

Further, the oxygen-containing gas flow grooves 38a are provided to face the outer end 52be of the cathode side electrode catalyst layer 52b. Therefore, the oxygen-containing gas can be supplied reliably to the outer end 52be. It should be noted that the gas impermeable film 56 is not essential, and only the gas impermeable film 66 may be provided on the side where the cathode side electrode catalyst layer 52b is provided.

Figure 9:
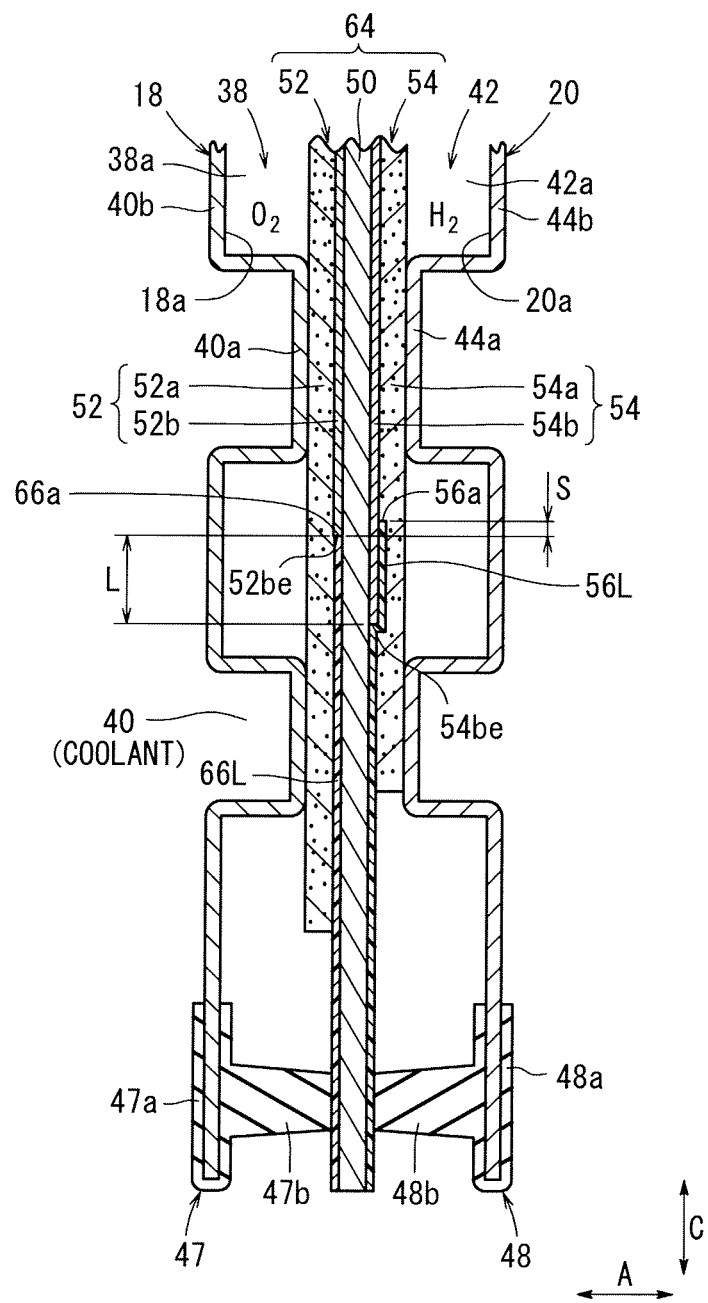
FIG. 9 is a cross sectional view showing main components of a power generation cell according to a fifth embodiment of the present invention.

FIG. 9 is a cross sectional view showing main components of a power generation cell 68 of a fuel cell 67 according to a fifth embodiment of the present invention. The constituent elements of the fuel cell 67 that are identical to those of the fuel cell 60 according to the fourth embodiment are labeled with the same reference numerals, and descriptions thereof will be omitted.

In the power generation cell 68, a gas impermeable film 56L is provided on the outer portion of the anode side electrode catalyst layer 54b, and a frame shaped gas impermeable film 66L is provided around a cathode side electrode catalyst layer 52b. The gas impermeable films 56L, 66L and the solid polymer electrolyte membrane 50 have the same outer size. Thus, in the fifth embodiment, the solid polymer electrolyte membrane 50 can be protected more reliably.

The gas impermeable film 66L may include a portion overlapped with the cathode side electrode catalyst layer 52b. In this case, the overlapping portion may be provided by extending the gas impermeable film 66L into the position between the solid polymer electrolyte membrane 50 and the cathode side electrode catalyst layer 52b. Alternatively, the overlapping portion may be formed by extending the gas impermeable film 66L into the position between the cathode side electrode catalyst layer 52b and a cathode side gas diffusion layer 52a.

Figure 10:
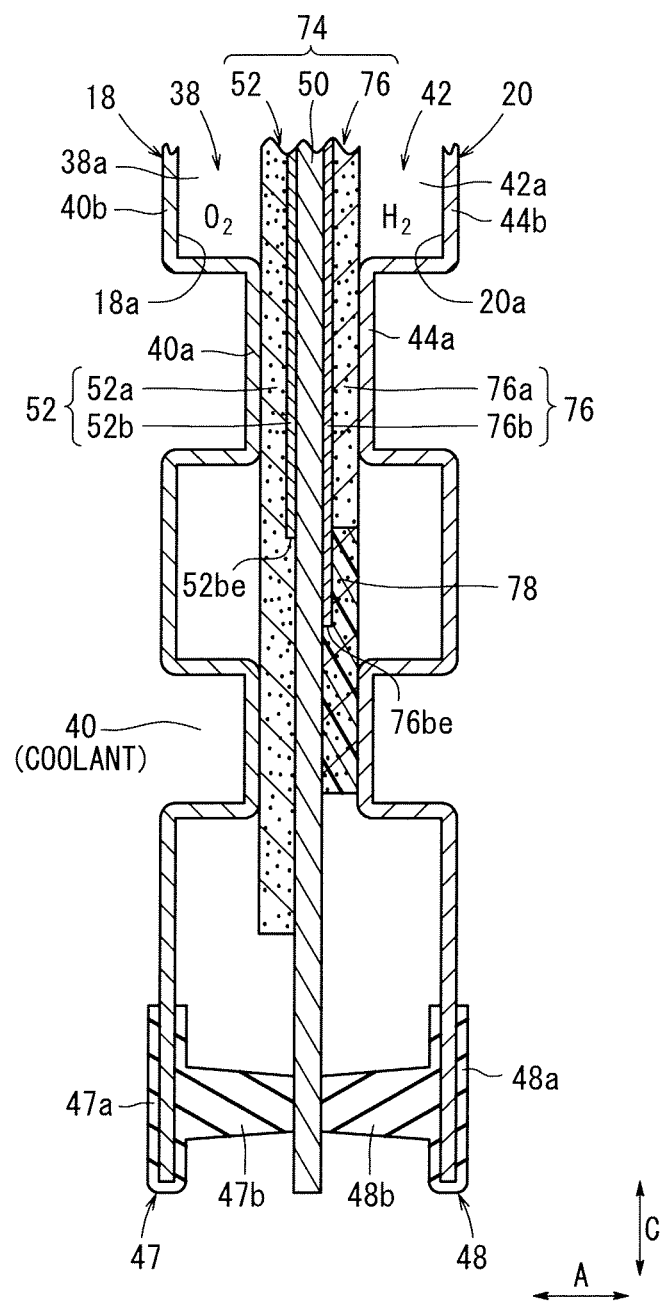
FIG. 10 is a cross sectional view showing main components of a power generation cell according to a sixth embodiment of the present invention.

FIG. 10 is a cross sectional view showing main components of a power generation cell 72 of a fuel cell 70 according to a sixth embodiment of the present invention.

The power generation cell 72 includes a membrane electrode assembly (MEA) 74, and a first metal separator 18 and a second metal separator 20 sandwiching the membrane electrode assembly 74. The membrane electrode assembly 74 includes a cathode 52, and an anode 76, and a solid polymer electrolyte membrane 50 interposed between the cathode 52 and the anode 76.

The anode 76 includes an anode side gas diffusion layer 76a and an anode side electrode catalyst layer (second electrode catalyst layer) 76b. A frame shaped barrier layer such as a frame shaped resin impregnation portion 78 is provided at an outer end 76be of the anode side electrode catalyst layer 76b by heating resin to melt the resin for impregnation of the anode side gas diffusion layer 76a. Resin material such as PVDF (polyvinylidene fluoride) or PPS (poly phenylene sulfide) is adopted for the resin impregnation portion 78. The resin impregnation portion 78 has metal ion impermeability. Preferably, an electrical insulating layer coated with resin is provided on the surface of this resin impregnation portion 78. The electrical insulating layer may not necessarily cover the entire surface of the resin impregnation portion 78.

In the sixth embodiment, the resin impregnation portion 78 is provided on the outer portion of the anode side electrode catalyst layer 76b. In the structure, dissolution of the metal ions from the outer end of the second metal separator 20 can be suppressed. Therefore, the same advantages as in the case of the first embodiment are obtained. For example, with the simple and economical structure, degradation of the solid polymer electrolyte membrane 50 can be suppressed as much as possible.

Figure 11:
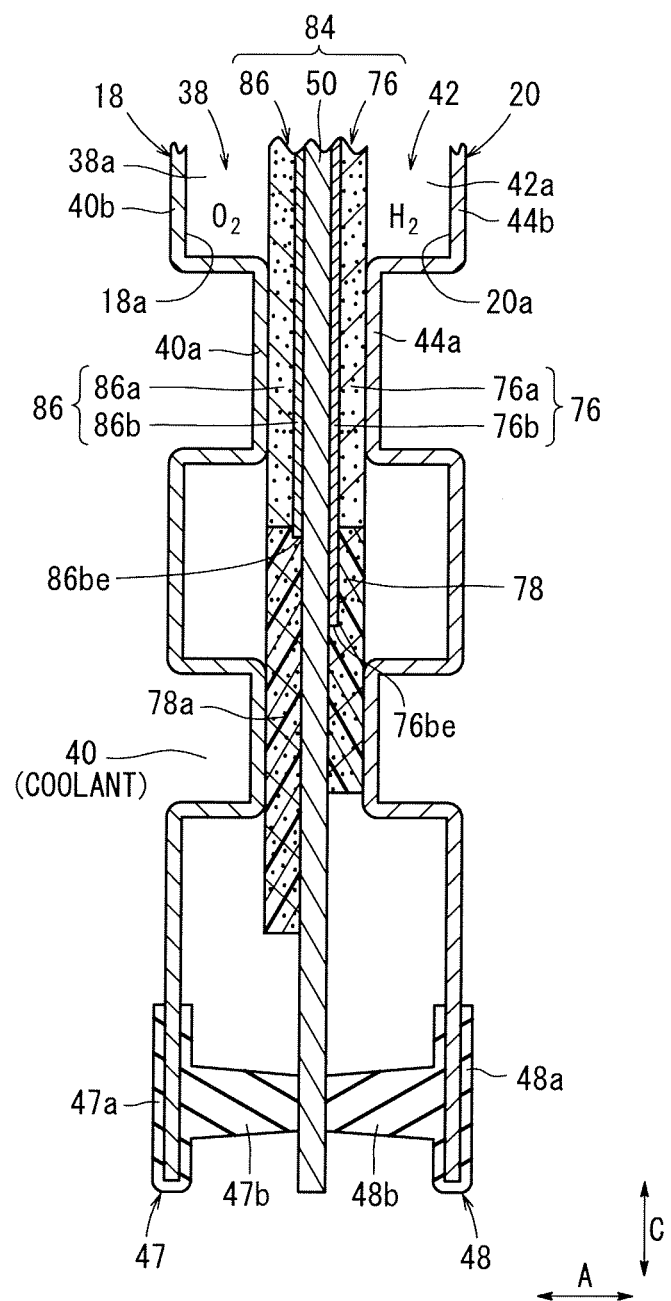
FIG. 11 is a cross sectional view showing main components of a power generation cell according to a seventh embodiment of the present invention.

FIG. 11 is a cross sectional view showing main components of a power generation cell 82 of a fuel cell 80 according to a seventh embodiment of the present invention.

The power generation cell 82 includes a membrane electrode assembly (MEA) 84, and a first metal separator 18 and a second metal separator 20 sandwiching the membrane electrode assembly 84. The membrane electrode assembly 84 includes a cathode 86, and an anode 76, and a solid polymer electrolyte membrane 50 interposed between the cathode 86 and the anode 76.

The cathode 86 includes a cathode side gas diffusion layer 86a and a cathode side electrode catalyst layer (first electrode catalyst layer) 86b. A frame shaped resin impregnation portion 78 is provided around an outer end 76be of the anode side electrode catalyst layer 76b, and a frame shaped barrier layer such as a frame shaped resin impregnation portion 78a is provided around an outer end 86be of the cathode side electrode catalyst layer 86b by impregnation of the cathode side gas diffusion layer 86a with resin.

The resin impregnation portion 78a contacts the outer end 86be of the cathode side electrode catalyst layer 86b, or the resin impregnation portion 78a is partially overlapped with the outer end 86be of the cathode side electrode catalyst layer 86b.

In the seventh embodiment, the frame shaped resin impregnation portion 78a is provided around the cathode side electrode catalyst layer 86b. In the structure, the same advantages as in the case of the fourth embodiment are obtained. For example, at the cathode 86, even if stagnant water is present around the cathode side electrode catalyst layer 86b, the solid polymer electrolyte membrane 50 can be protected suitably.

Figure 12:
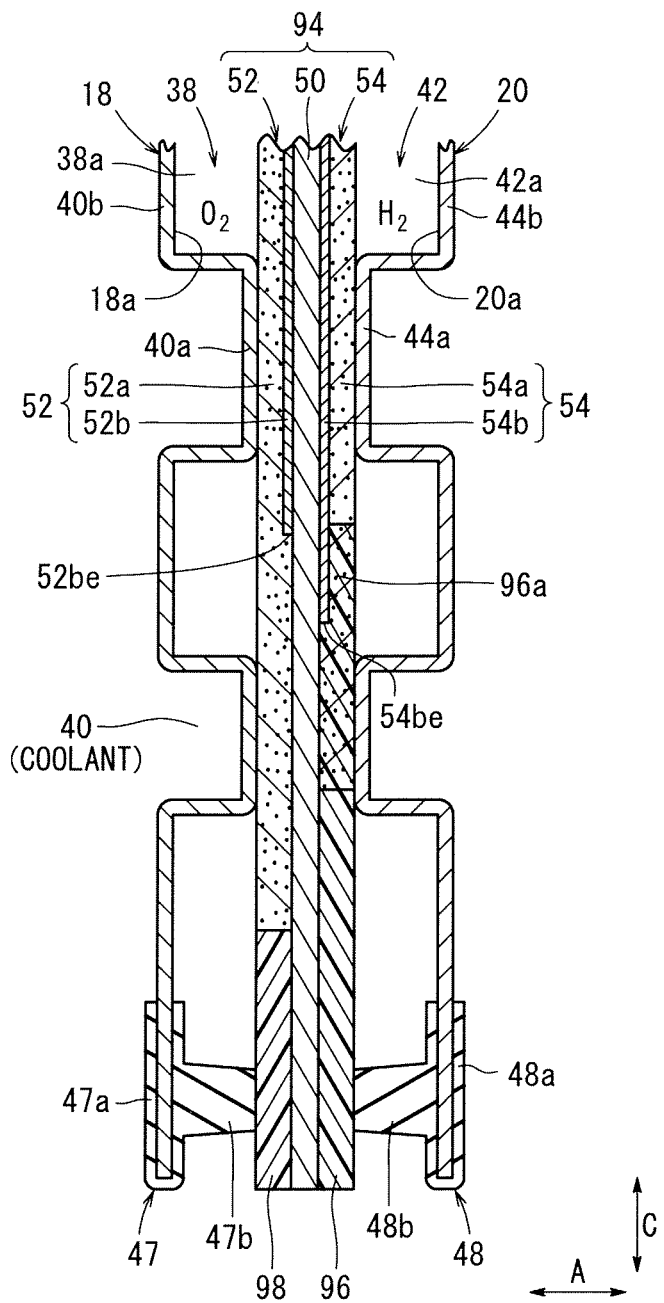
FIG. 12 is a cross sectional view showing main components of a power generation cell according to an eighth embodiment of the present invention.

FIG. 12 is a cross sectional view showing main components of a power generation cell 92 of a fuel cell 90 according to an eighth embodiment of the present invention.

The power generation cell 92 includes a membrane electrode assembly (MEA) 94, and a first metal separator 18 and a second metal separator 20 sandwiching the membrane electrode assembly 94. The membrane electrode assembly 94 includes a cathode 52, and an anode 54, and a solid polymer electrolyte membrane 50 interposed between the cathode 52 and the anode 54.

Resin frame members 96, 98 are joined to the outer end of the solid polymer electrolyte membrane 50, and the resin frame member 96 includes a resin impregnation portion (frame shaped barrier layer) 96a along the outer portion of an anode side electrode catalyst layer 54*b* for impregnation of an anode side gas diffusion layer 54*a*.

Resin material such as PVDF (polyvinylidene fluoride) or PPS (poly phenylene sulfide) is adopted for the resin frame members 96, 98. The resin impregnation portion 96*a* is formed integrally with the resin frame member 96, and the anode side gas diffusion layer 54*a* is impregnated with the resin impregnation portion 96*a* by heating, and applying pressure to the resin impregnation portion 96*a*.

By providing the resin frame members 96, 98, exposure of the solid polymer electrolyte membrane 50 is prevented, and the solid polymer electrolyte membrane 50 can be protected. Also in a ninth embodiment described later, the same advantages are obtained.

In the eighth embodiment, the resin impregnation portion 96*a* where the anode side gas diffusion layer 54*a* is impregnated with part of the resin frame member 96 is provided at the outer portion of the anode side electrode catalyst layer 54*b*. Thus, the same advantages as in the case of the first and subsequent embodiments are obtained. For example, dissolution of metal ions from the outer end of the second metal separator 20 is prevented, and with the simple and economical structure, degradation of the solid polymer electrolyte membrane 50 can be prevented as much as possible.

Figure 13:
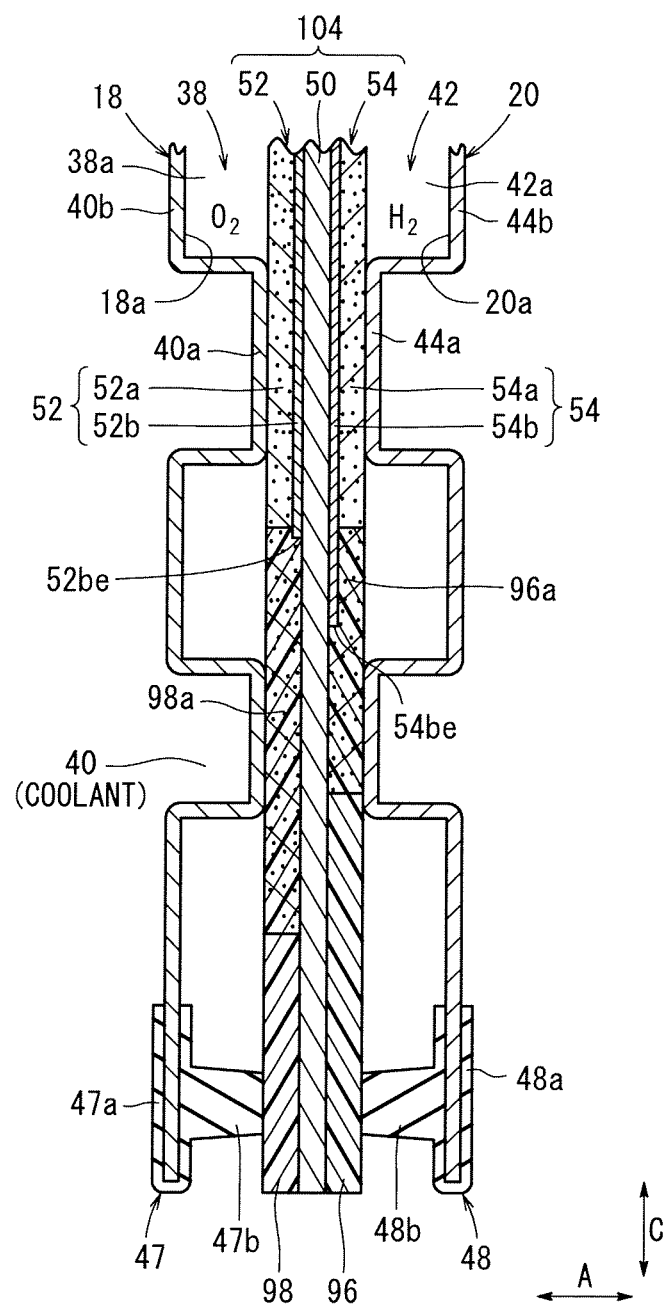
FIG. 13 is a cross sectional view showing main components of a power generation cell according to a ninth embodiment of the present invention.

FIG. 13 is a cross sectional view showing main components of a power generation cell 102 of a fuel cell 100 according to a ninth embodiment of the present invention.

The power generation cell 102 includes a membrane electrode assembly (MEA) 104, and a first metal separator 18 and a second metal separator 20 sandwiching the membrane electrode assembly 104. The membrane electrode assembly 104 includes a cathode 52, an anode 54, and a solid polymer electrolyte membrane 50 interposed between the cathode 52 and the anode 54.

A resin impregnation portion 96*a* where an anode side gas diffusion layer 54*a* is impregnated with part of a resin frame member 96 is provided around an anode side electrode catalyst layer 54*b*. A resin impregnation portion (frame shaped insulating portion) 98*a* where a cathode side gas diffusion layer 52*a* is impregnated with part of the resin frame member 98 is provided around a cathode side electrode catalyst layer 52*b*. The resin impregnation portion 98*a* contacts an outer end 52*be* of the cathode side electrode catalyst layer 52*b*, or the resin impregnation portion 98*a* is partially overlapped with the outer end 52*be* of the cathode side electrode catalyst layer 52*b*.

In the ninth embodiment, the frame shaped resin impregnation portion 98*a* is provided around the cathode side electrode catalyst layer 52*b*. In the structure, at the cathode 52, even if stagnant water is present around the cathode side electrode catalyst layer 52*b*, the solid polymer electrolyte membrane 50 can be protected suitably.

Figure 14:
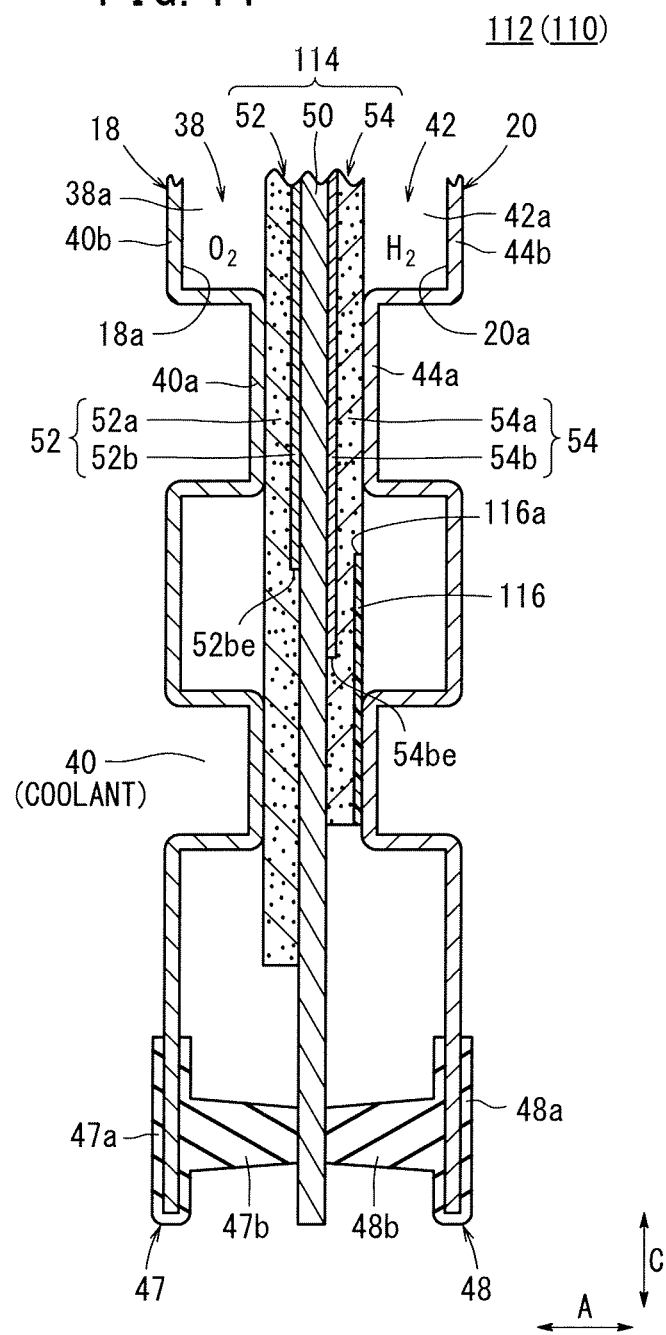
FIG. 14 is a cross sectional view showing main components of a power generation cell according to a tenth embodiment of the present invention.

FIG. 14 is a cross sectional view showing main components of a power generation cell 112 of a fuel cell 110 according to a tenth embodiment of the present invention.

The power generation cell 112 includes a membrane electrode assembly (MEA) 114 and a first metal separator 18 and a second metal separator 20 sandwiching the membrane electrode assembly 114. The membrane electrode assembly 114 includes a cathode 52, an anode 54, and a solid polymer electrolyte membrane 50 interposed between the cathode 52 and the anode 54.

A frame shaped barrier layer such as a frame shaped gas impermeable film 116 is provided around an anode side electrode catalyst layer 54*b*, more specifically, between an anode side gas diffusion layer 54*a* and the second metal separator 20. An inner end 116*a* of the gas impermeable film 116 and at least an outer end 52*be* of a cathode side electrode catalyst layer 52*b* are overlapped with each other on both sides of the solid polymer electrolyte membrane 50.

In the tenth embodiment, the gas impermeable film 116 is provided between the anode side gas diffusion layer 54*a* and the second metal separator 20. Thus, with the simple and economical structure, the same advantages as in the case of the first and the subsequent embodiments are obtained. For example, dissolution of metal ions from the second metal separator 20 is prevented, and degradation of the solid polymer electrolyte membrane 50 can be prevented as much as possible.

Figure 15:
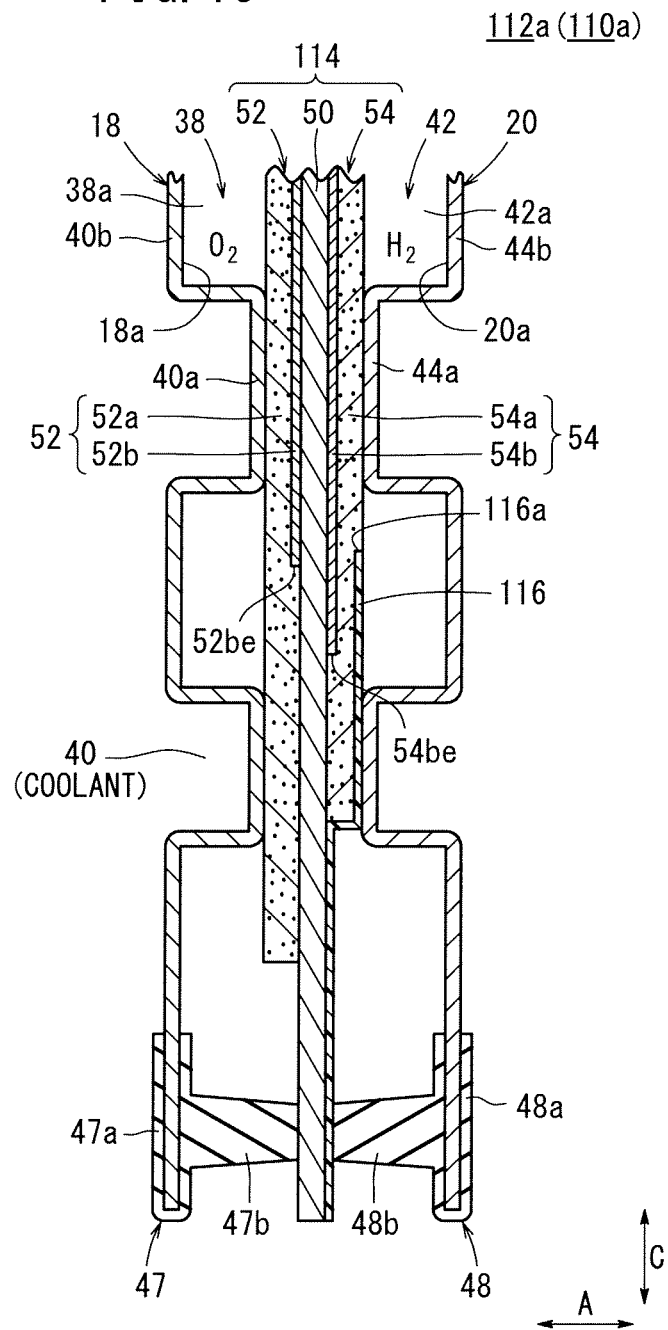
FIG. 15 is a cross sectional view showing main components of a power generation cell according to an eleventh embodiment of the present invention.

FIG. 15 is a cross sectional view showing main components of a power generation cell 112*a* of a fuel cell 110*a* according to an eleventh embodiment of the present invention.

In the eleventh embodiment, the gas impermeable film 116 is provided, and the outer size of the gas impermeable film 116 is the same as the outer size of the solid polymer electrolyte membrane 50. Therefore, in the eleventh embodiment, the solid polymer electrolyte membrane 50 can be protected further reliably.

Figure 16:
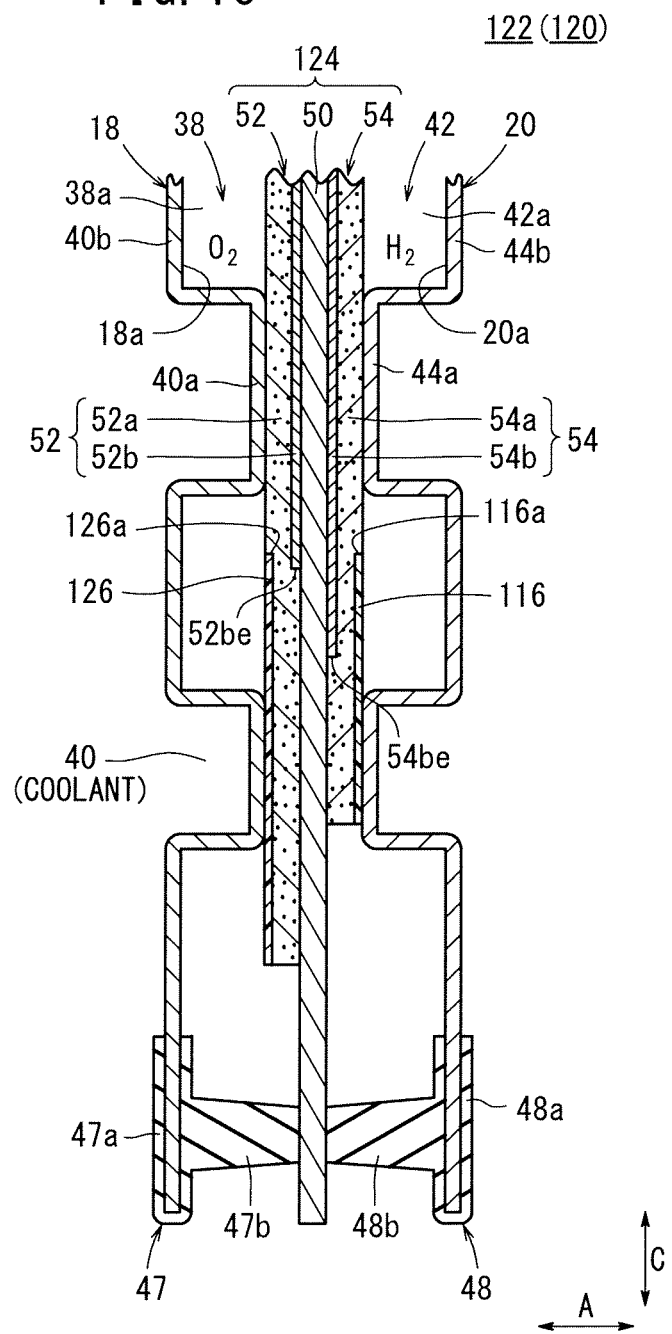
FIG. 16 is a cross sectional view showing main components of a power generation cell according to a twelfth embodiment of the present invention.

FIG. 16 is a cross sectional view showing main components of a power generation cell 122 of a fuel cell 120 according to a twelfth embodiment of the present invention.

The power generation cell 122 includes a membrane electrode assembly (MEA) 124 and a first metal separator 18 and a second metal separator 20 sandwiching the membrane electrode assembly 124. The membrane electrode assembly 124 includes a cathode 52, an anode 54, and a solid polymer electrolyte membrane 50 interposed between the cathode 52 and the anode 54.

A gas impermeable film 116 is provided between an anode side gas diffusion layer 54*a* and the second metal separator 20, and a frame shaped barrier layer such as a frame shaped gas impermeable film 126 is provided between a cathode side gas diffusion layer 52*a* and the first metal separator 18. An inner end 126*a* of the gas impermeable film 126 is positioned adjacent to, or partially overlapped with an outer end 52*be* of a cathode side electrode catalyst layer 52*b* in the stacking direction.

In the twelfth embodiment, the frame shaped gas impermeable film 126 is provided around the cathode side gas diffusion layer 52*a*. Thus, the solid polymer electrolyte membrane 50 can be protected suitably.

Figure 17:
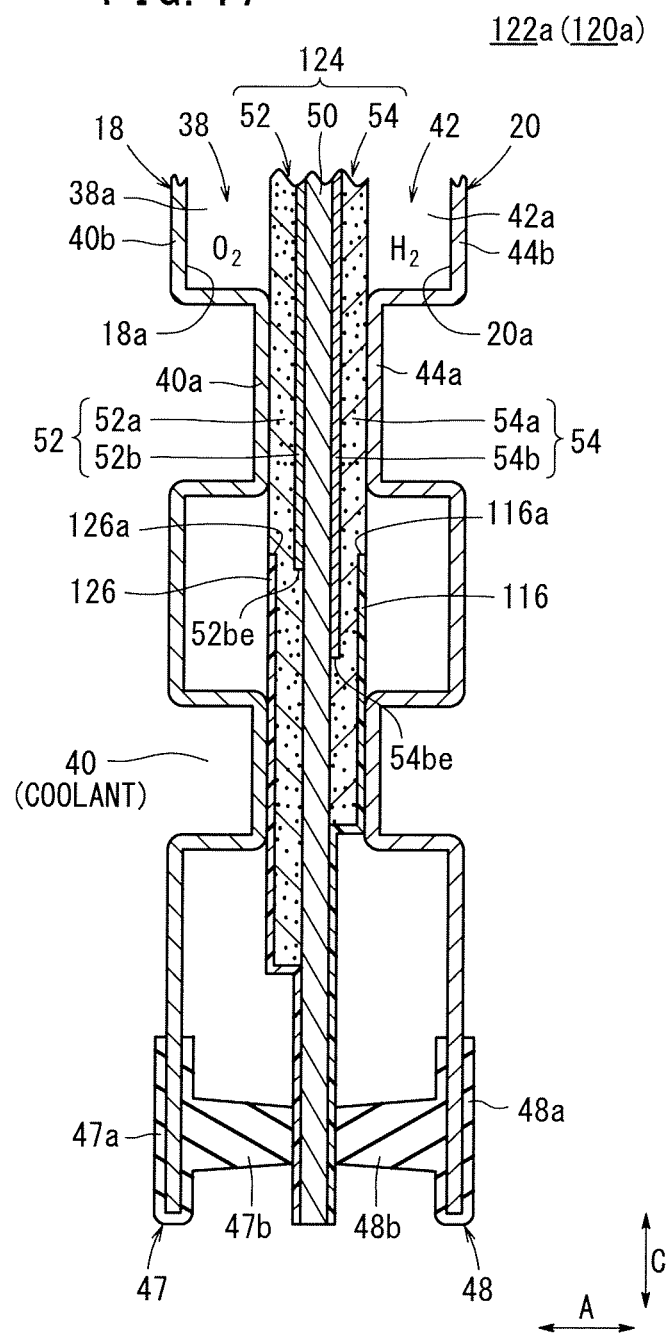
FIG. 17 is a cross sectional view showing main components of a power generation cell according to a thirteenth embodiment of the present invention.

FIG. 17 is a cross sectional view showing main components of a power generation cell 122*a* of a fuel cell 120*a* according to a thirteenth embodiment of the present invention.

In the thirteenth embodiment, the outer size of the gas impermeable film 116 is the same as the outer size of the solid polymer electrolyte membrane 50, and the outer size of the gas impermeable film 126 is the same as the outer size of the solid polymer electrolyte membrane 50. Therefore, in the thirteenth embodiment, the solid polymer electrolyte membrane 50 can be protected further reliably.

Figure 18:
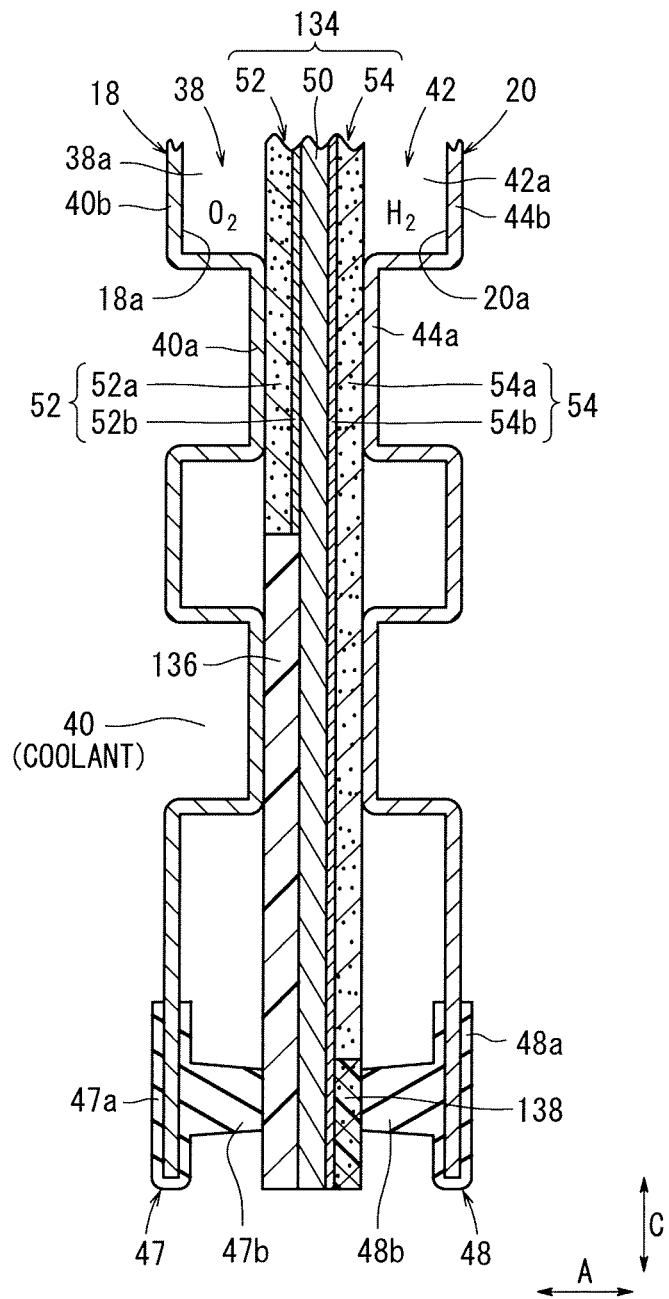
FIG. 18 is a cross sectional view showing main components of a power generation cell according to a fourteenth embodiment of the present invention.

FIG. 18 is a cross sectional view showing main components of a power generation cell 132 of a fuel cell 130 according to a fourteenth embodiment of the present invention.

The power generation cell 132 includes a membrane electrode assembly 134. In a cathode 52 of the membrane electrode assembly 134, the surface sizes of a cathode side gas diffusion layer 52*a* and a cathode side electrode catalyst layer 52*b* are the same, and smaller than the surface size of the solid polymer electrolyte membrane 50. In the anode 54 of the membrane electrode assembly 134, the surface sizes of an anode side gas diffusion layer 54*a* and an anode side electrode catalyst layer 54*b* are the same as the surface size of the solid polymer electrolyte membrane 50.

At the outer end of the solid polymer electrolyte membrane 50 extending outward beyond the outer end of the cathode 52, a gas impermeable film 136 contacts the outer end of the cathode side electrode catalyst layer 52*b* of the cathode 52. Preferably, the thickness of the gas impermeable film 136 is equal to the thickness of the cathode 52. At the contact portion between the anode 54 and the ridge seal 48*b*, a resin impregnation portion 138 where the anode side gas diffusion layer 54*a* and the anode side electrode catalyst layer 54*b* are impregnated with resin is provided.

In the fourteenth embodiment, the same advantages as in the case of the fourth and the subsequent embodiments are obtained.

Figure 19:
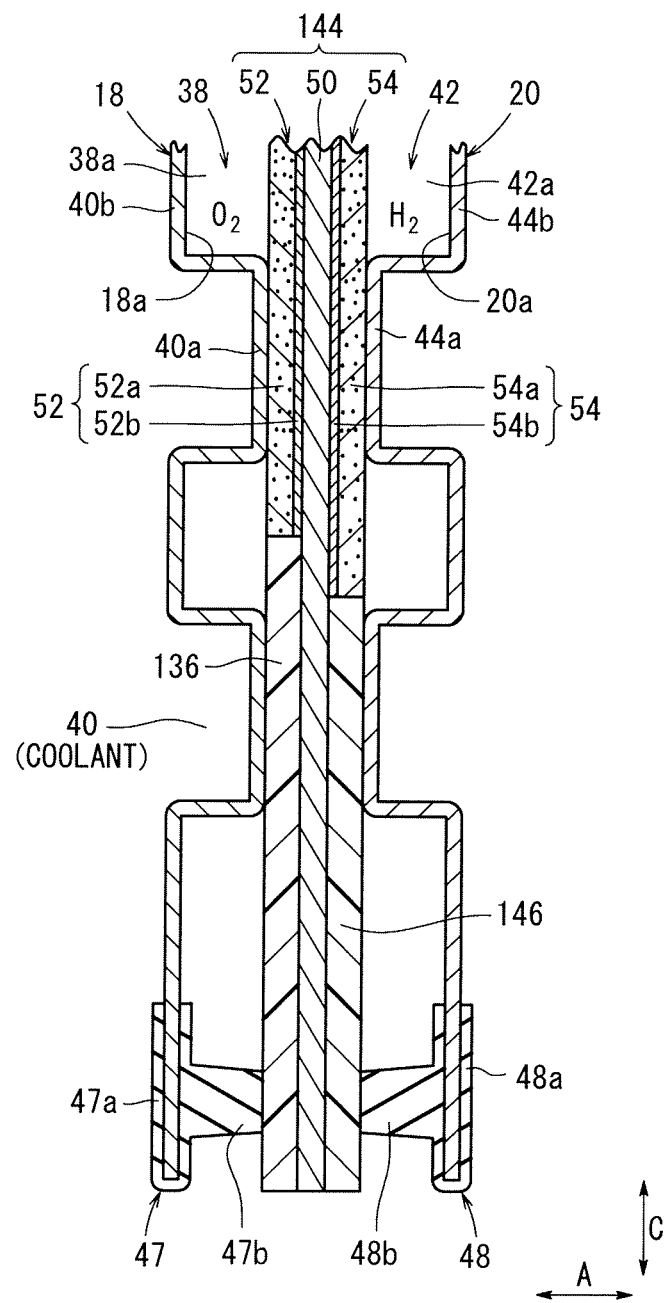
FIG. 19 is a cross sectional view showing main components of a power generation cell according to a fifteenth embodiment of the present invention.

FIG. 19 is a cross sectional view showing main components of a power generation cell 142 of a fuel cell 140 according to a fifteenth embodiment of the present invention.

The power generation cell 142 includes a membrane electrode assembly 144. In a cathode 52 of the membrane electrode assembly 144, the surface sizes of a cathode side gas diffusion layer 52*a* and a cathode side electrode catalyst layer 52*b* are the same, and smaller than the surface size of a solid polymer electrolyte membrane 50. In an anode 54 of the membrane electrode assembly 144, the surface sizes of an anode side gas diffusion layer 54*a* and an anode side electrode catalyst layer 54*b* are the same, and smaller than the surface size of the solid polymer electrolyte membrane 50. The surface size of the anode 54 is larger than the surface size of the cathode 52.

Preferably, the outer end of the anode side electrode catalyst layer 54*b* of the anode 54 is positioned within the area of a fuel gas flow grooves 42*a* because the fuel gas and the water produced in the power generation reaction are not retained as stagnant fuel gas or water.

At the outer end of the solid polymer electrolyte membrane 50 which extends outward beyond the outer end of the cathode 52, a gas impermeable film 136 is provided to contact the outer end of the cathode side electrode catalyst layer 52*b* of the cathode 52. At the outer end of the solid polymer electrolyte membrane 50 which extends outward beyond the outer end of the anode 54, a gas impermeable film 146 is provided to contact the outer end of the anode side electrode catalyst layer 54*b* of the anode 54. Preferably, the thickness of the gas impermeable film 146 is equal to the thickness of the anode 54.

In the fifteenth embodiment, the same advantages as in the case of the fourth and the subsequent embodiments are obtained. In the thirteenth and fourteenth embodiments, though the surface size of the anode 54 is larger than the surface size of the cathode 52, conversely, the surface size of the cathode 52 may be larger than the surface size of the anode 54.

Figure 20:
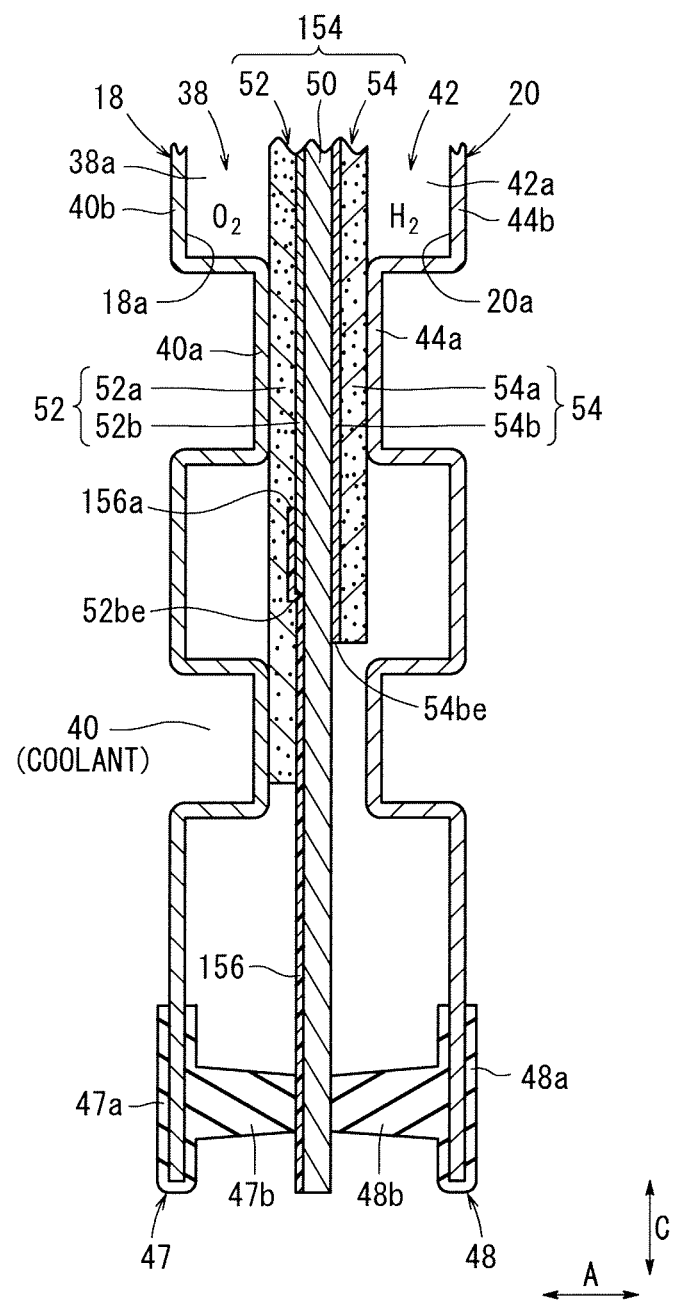
FIG. 20 is a cross sectional view showing main components of a power generation cell according to a sixteenth embodiment of the present invention.

FIG. 20 is a cross sectional view showing main components of a power generation cell 152 of a fuel cell 150 according to a sixteenth embodiment of the present invention.

The power generation cell 152 includes a membrane electrode assembly (MEA) 154, and a first metal separator 18 and a second metal separator 20 sandwiching the membrane electrode assembly 154. The membrane electrode assembly 154 includes a cathode 52, an anode 54, and a solid polymer electrolyte membrane 50 interposed between the cathode 52 and the anode 54.

In the anode 54, the surface size of an anode side electrode catalyst layer 54*b* is the same as the surface size of an anode side gas diffusion layer 54*a*. At the cathode 52, a frame shaped barrier layer such as a frame shaped gas impermeable film 156 is provided such that an inner end 156*a* of the frame shaped gas impermeable film 156 is overlapped with the outer end of a cathode side electrode catalyst layer 52*b*. The outer size of the gas impermeable film 156 is the same as the outer size of the solid polymer electrolyte membrane 50.

The outer end of the anode side electrode catalyst layer 54*b* is positioned within the area of the fuel gas flow grooves 42*a*, and the outer end of the cathode side electrode catalyst layer 52*b* is positioned within the area of the oxygen-containing gas flow grooves 38*a*. The gas impermeable film 156 may be provided between the solid polymer electrolyte membrane 50 and the cathode side electrode catalyst layer 52*b*.

In the sixteenth embodiment, the same advantages as in the case of the fourth and the subsequent embodiments are obtained.

Figure 21:
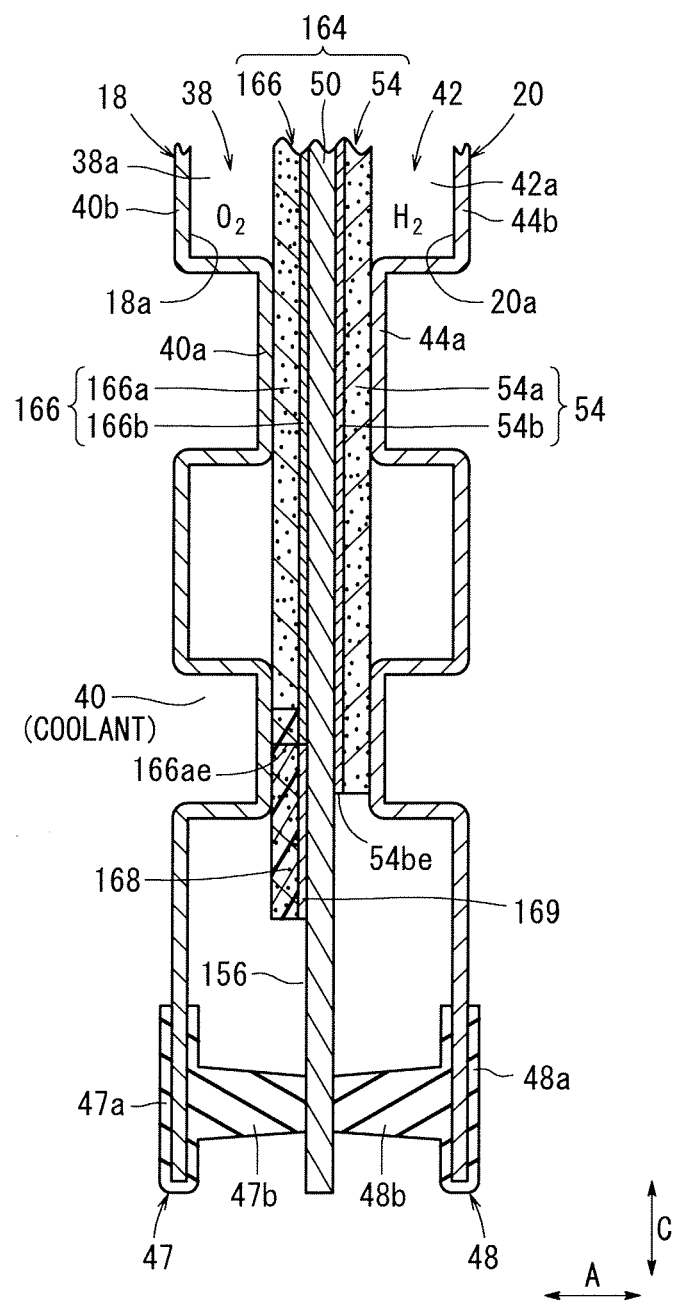
FIG. 21 is a cross sectional view showing main components of a power generation cell according to a seventeenth embodiment of the present invention.

FIG. 21 is a cross sectional view showing main components of a power generation cell 162 of a fuel cell 160 according to a seventeenth embodiment of the present invention.

The power generation cell 162 includes a membrane electrode assembly (MEA) 164 and a first metal separator 18 and a second metal separator 20 sandwiching the membrane electrode assembly 164. The membrane electrode assembly 164 includes a cathode 166, and an anode 54, and a solid polymer electrolyte membrane 50 interposed between the cathode 166 and the anode 54.

The cathode 166 includes a cathode side electrode catalyst layer 166*b* and a cathode side gas diffusion layer 166*a*. A frame shaped barrier layer such as a frame shaped resin impregnation portion 168 is provided at an outer end 166*ae* of the cathode side gas diffusion layer 166*a* such that the resin impregnation portion 168 is overlapped with the cathode side electrode catalyst layer 166*b* by impregnating the cathode side gas diffusion layer 166*a* with resin. The resin impregnation portion 168 may contact the cathode side electrode catalyst layer 166*b*. An adhesive layer 169 is provided between the portion of the cathode side gas diffusion layer 166*a* around the cathode side electrode catalyst layer 166*b* and the solid polymer electrolyte membrane 50.

In the seventeenth embodiment, the resin impregnation portion 168 is only provided at the cathode 166, and the same advantages as in the case of the fourth and the subsequent embodiments are obtained.

Figure 22:
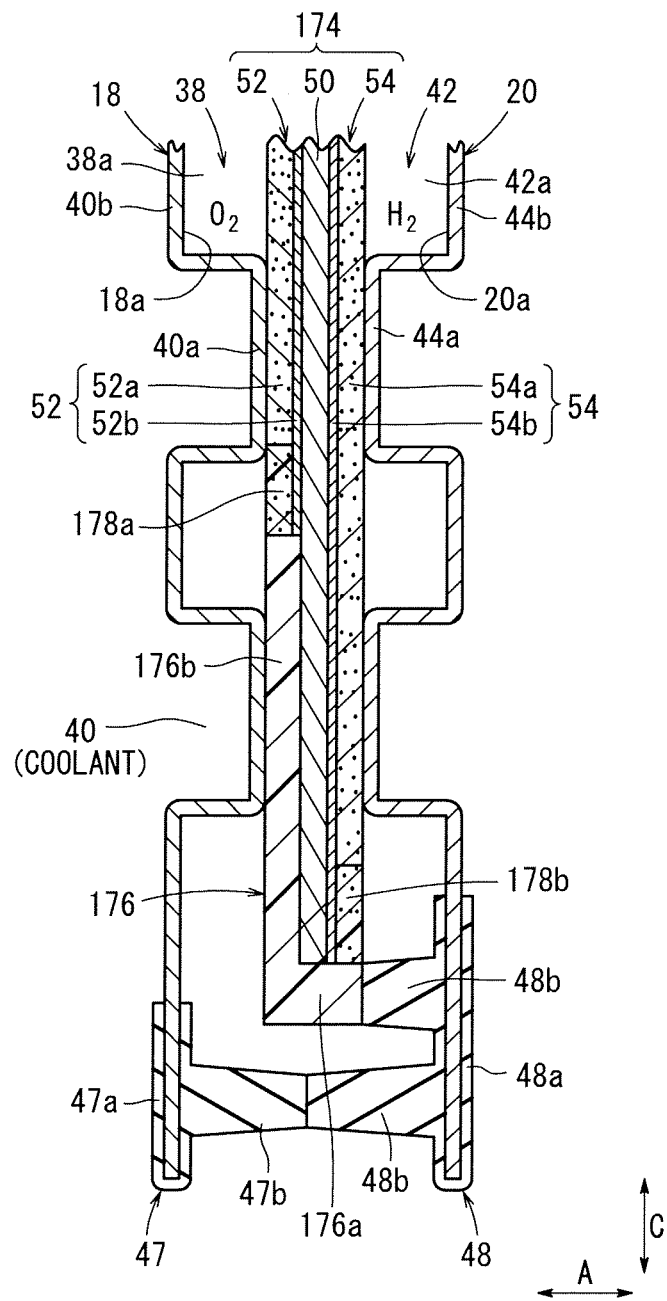
FIG. 22 is a cross sectional view showing main components of a power generation cell according to an eighteenth embodiment of the present invention.

FIG. 22 is a cross sectional view showing main components of a power generation cell 172 of a fuel cell 170 according to an eighteenth embodiment of the present invention.

The power generation cell 172 includes a membrane electrode assembly (MEA) 174 and a first metal separator 18 and a second metal separator 20 sandwiching the membrane electrode assembly 174. The membrane electrode assembly 174 includes a cathode 52, and an anode 54, and a solid polymer electrolyte membrane 50 interposed between the cathode 52 and the anode 54.

In the cathode 52, the surface size of a cathode side electrode catalyst layer 52*b* is the same as the surface size of a cathode side gas diffusion layer 52*a*. In the anode 54, the surface size of an anode side electrode catalyst layer 54*b* is the same as the surface size of an anode side gas diffusion layer 54*a*. The surface size of the anode 54 is the same as the surface size of the solid polymer electrolyte membrane 50, and larger than the surface size of the cathode 52.

A resin frame member 176 is joined to the outer portion of the membrane electrode assembly 174. The resin frame member 176 has electrical insulating capability. Further, it is preferable that this resin frame member 176 has metal ion impermeability. The resin frame member 176 has an L-shape in cross section. The outer end of the anode 54 and the outer end of the solid polymer electrolyte membrane 50 contact, and are joined to a bottom surface 176a of the resin frame member 176 extending in the stacking direction. The outer end of the cathode 52 contacts, and is joined to an inner end 176b of the resin frame member 176 which protrudes inwardly. A resin impregnation portion 178a may be provided at the outer end of the cathode 52 by impregnation of resin, and a resin impregnation portion 178b may be provided at the outer end of the anode 54 by impregnation of resin.

In the eighteenth embodiment, the resin frame member 176 is provided. Thus, the same advantages as in the case of, in particular, the eighth embodiment are obtained.

Figure 23:
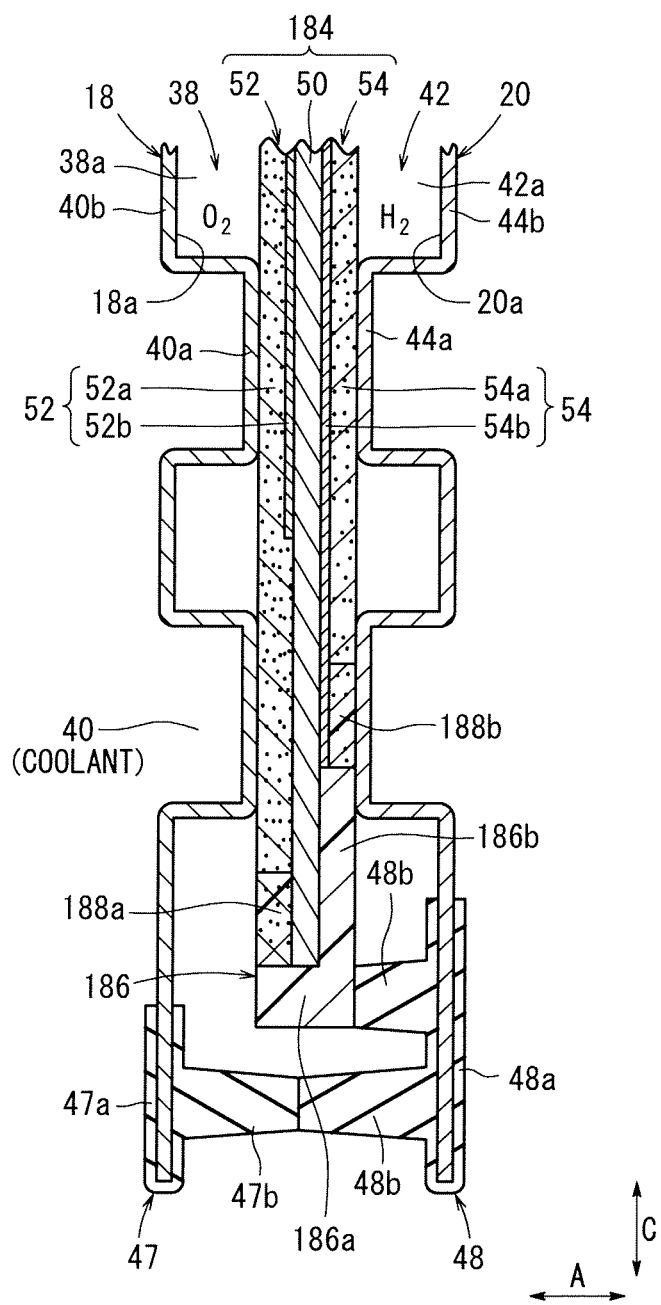
FIG. 23 is a cross sectional view showing main components of a power generation cell according to a nineteenth embodiment of the present invention.

FIG. 23 is a cross sectional view showing main components of a power generation cell 182 of a fuel cell 180 according to a nineteenth embodiment of the present invention.

The power generation cell 182 includes a membrane electrode assembly (MEA) 184 and a first metal separator 18 and a second metal separator 20 sandwiching the membrane electrode assembly 184. The membrane electrode assembly 184 includes a cathode 52, and an anode 54, and a solid polymer electrolyte membrane 50 interposed between the cathode 52 and the anode 54.

In the cathode 52, the surface size of a cathode side electrode catalyst layer 52b is smaller than the surface size of a cathode side gas diffusion layer 52a, and the surface size of the cathode side gas diffusion layer 52a is substantially the same as the surface size of the solid polymer electrolyte membrane 50. In the anode 54, the surface size of an anode side electrode catalyst layer 54b is the same as the surface size of an anode side gas diffusion layer 54a. The surface size of the anode 54 is larger than the surface size of the cathode side electrode catalyst layer 52b, and smaller than the surface size of the cathode side gas diffusion layer 52a.

A resin frame member 186 is joined to the outer portion of the membrane electrode assembly 184. The resin frame member 186 has an L-shape in cross section. The outer end of the cathode side gas diffusion layer 52a and the outer end of the solid polymer electrolyte membrane 50 contact, and are joined to a bottom surface 186a of the resin frame member 186 extending in the stacking direction. The outer end of the anode 54 contacts, and is joined to an inner end 186b of the resin frame member 186 which protrudes inwardly.

A resin impregnation portion 188a may be provided at the outer end of the cathode 52 by impregnation of resin, and a resin impregnation portion 188b may be provided at the outer end of the anode 54 by impregnation of resin.

In the nineteenth embodiment, the resin frame member 186 is provided. The same advantages as in the case of, in particular, the eighteenth embodiment are obtained.

Figure 24:
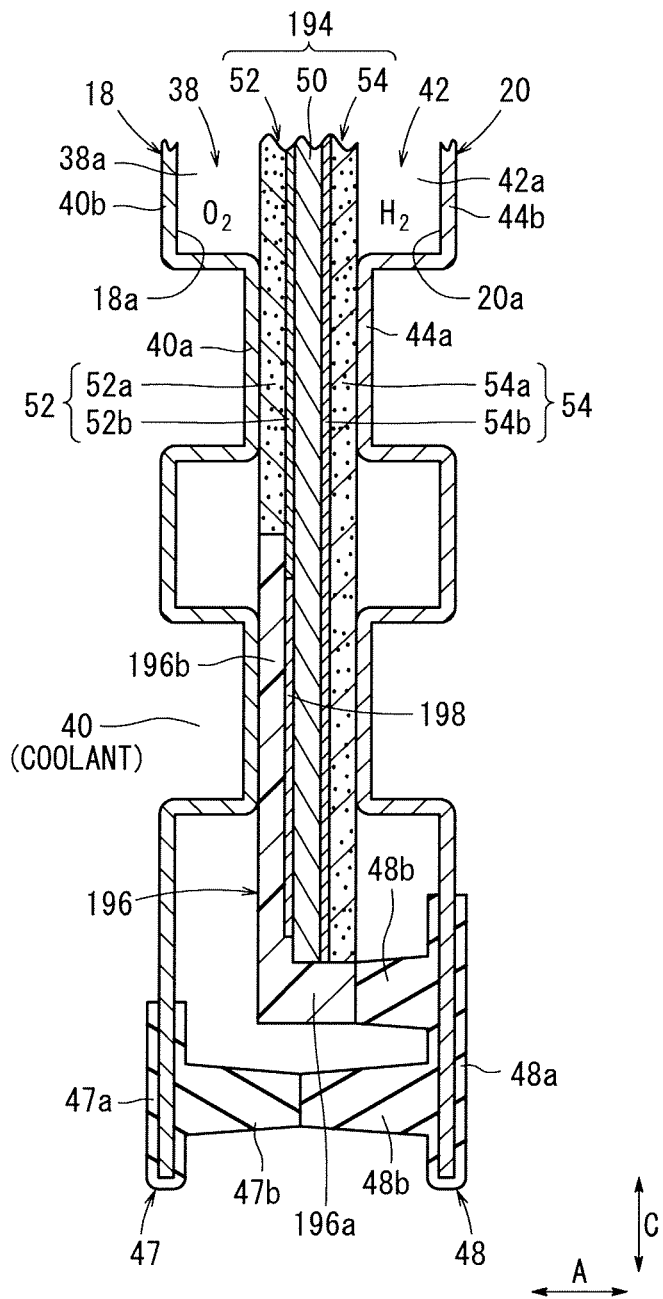
FIG. 24 is a cross sectional view showing main components of a power generation cell according to a twentieth embodiment of the present invention.

FIG. 24 is a cross sectional view showing main components of a power generation cell 192 of a fuel cell 190 according to a twentieth embodiment of the present invention.

The power generation cell 192 includes a membrane electrode assembly (MEA) 194 and a first metal separator 18 and a second metal separator 20 sandwiching the membrane electrode assembly 194. The membrane electrode assembly 194 includes a cathode 52, and an anode 54, and a solid polymer electrolyte membrane 50 interposed between the cathode 52 and the anode 54.

In the cathode 52, the surface size of a cathode side electrode catalyst layer 52b is larger than the surface size of a cathode side gas diffusion layer 52a. In the anode 54, the surface size of an anode side electrode catalyst layer 54b is the same as the surface size of an anode side gas diffusion layer 54a. The surface size of the anode 54 is the same as the surface size of the solid polymer electrolyte membrane 50, and larger than the surface size of the cathode 52.

A resin frame member 196 is joined to the outer portion of the membrane electrode assembly 194. The resin frame member 196 has an L-shape in cross section. The outer end of the anode 54 and the outer end of the solid polymer electrolyte membrane 50 contact, and are joined to a bottom surface 196a of the resin frame member 196 extending in the stacking direction. The outer end of the cathode side gas diffusion layer 52a contacts, and is joined to an inner end 196b of the resin frame member 196 which protrudes inwardly. An adhesive layer 198 is provided between the inner surface of the inner end 196b of the resin frame member 196 and the solid polymer electrolyte membrane 50.

In the twentieth embodiment, the resin frame member 196 is provided. Thus, the same advantages as in the cases of, in particular, the eighteenth and nineteenth embodiments are obtained.

Figure 25:
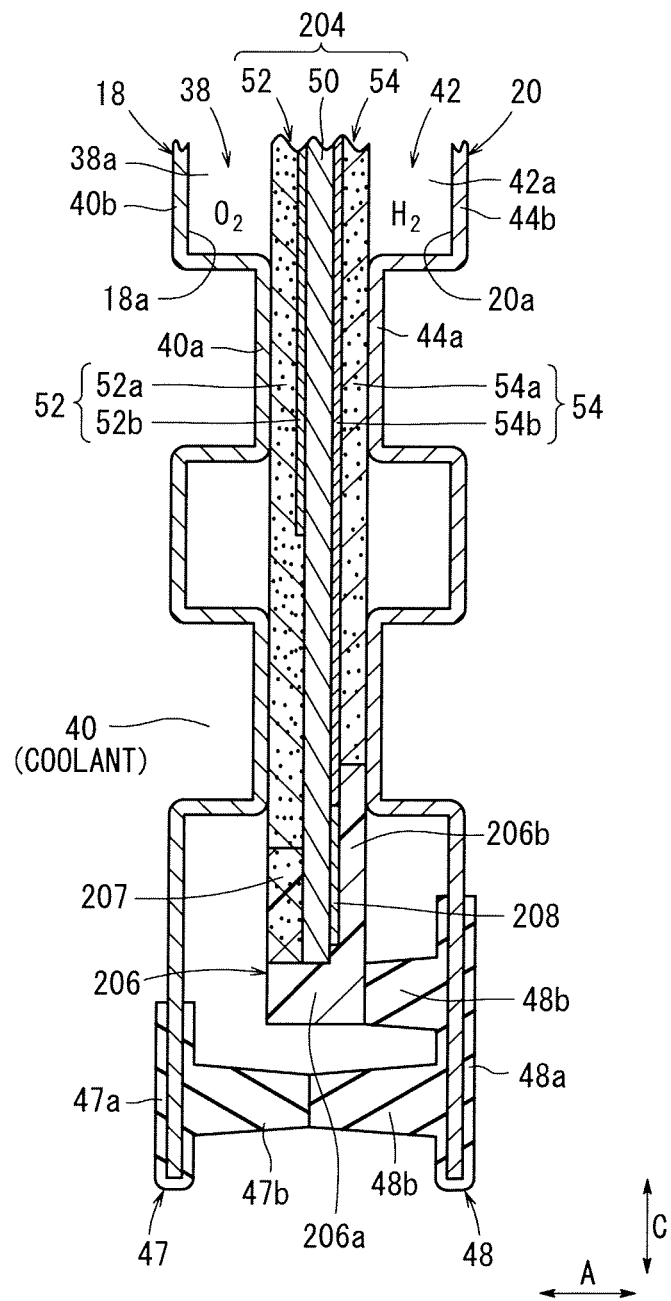
FIG. 25 is a cross sectional view showing main components of a power generation cell according to a twenty-first embodiment of the present invention.

FIG. 25 is a cross sectional view showing main components of a power generation cell 202 of a fuel cell 200 according to a twenty-first embodiment of the present invention.

The power generation cell 202 includes a membrane electrode assembly (MEA) 204 and a first metal separator 18 and a second metal separator 20 sandwiching the membrane electrode assembly 204. The membrane electrode assembly 204 includes a cathode 52, and an anode 54, and a solid polymer electrolyte membrane 50 interposed between the cathode 52 and the anode 54.

In the cathode 52, the surface size of a cathode side electrode catalyst layer 52b is smaller than the surface size of a cathode side gas diffusion layer 52a, and the surface size of the cathode side gas diffusion layer 52a is substantially the same as the surface size of the solid polymer electrolyte membrane 50. In the anode 54, the surface size of an anode side electrode catalyst layer 54b is larger than the surface size of an anode side gas diffusion layer 54a. The surface size of the anode side electrode catalyst layer 54b and the surface size of the anode side gas diffusion layer 54a are larger than the surface size of the cathode side electrode catalyst layer 52b.

A resin frame member 206 is joined to the outer portion of the membrane electrode assembly 204. The resin frame member 206 has an L-shape in cross section. The outer end of the cathode side gas diffusion layer 52a and the outer end of the solid polymer electrolyte membrane 50 contact, and are joined to a bottom surface 206a of the resin frame member 206 extending in the stacking direction. The outer end of the anode side gas diffusion layer 54a contacts, and is joined to an inner end 206b of the resin frame member 206 which protrudes inwardly.

A resin impregnation portion 207 may be provided at the outer end of the cathode 52 by impregnation of resin. An adhesive layer 208 is provided between the inner surface of the inner end 206b of the resin frame member 206 and the solid polymer electrolyte membrane 50.

In the twenty-first embodiment, the resin frame member 206 is provided. Thus, the same advantages as in the cases of, in particular, the eighteenth to twentieth embodiments are obtained.

Figure 26:
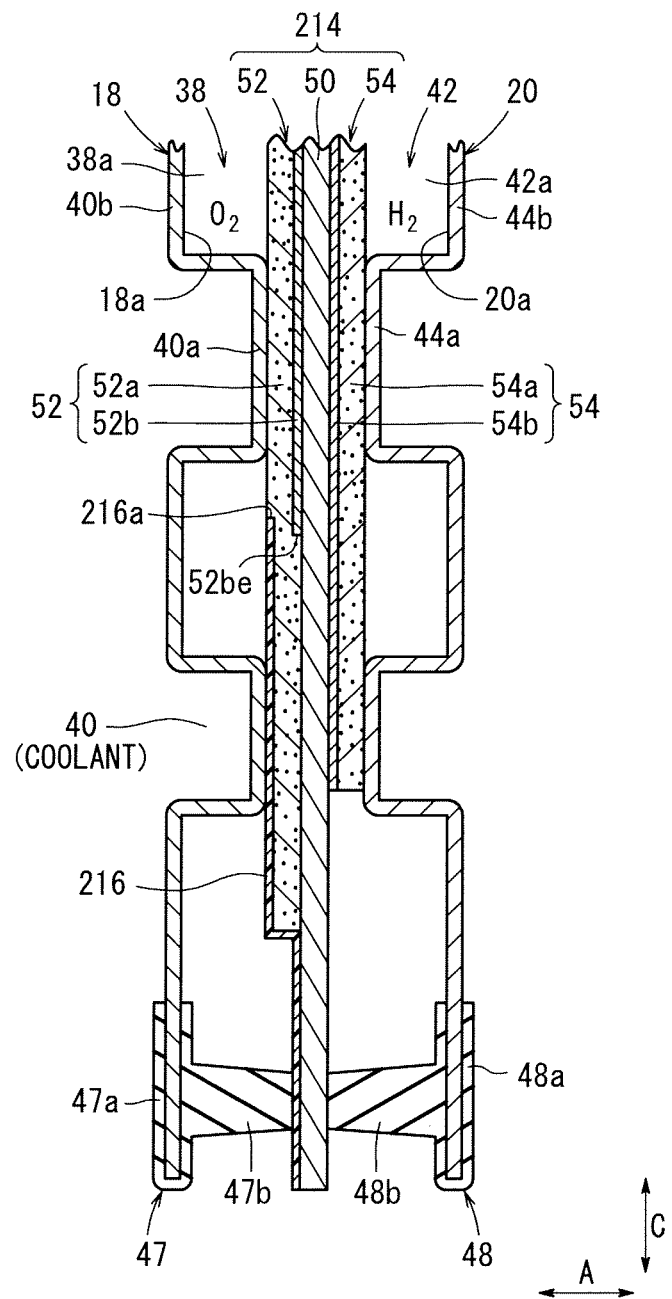
FIG. 26 is a cross sectional view showing main components of a power generation cell according to a twenty-second embodiment of the present invention.

FIG. 26 is a cross sectional view showing main components of a power generation cell 212 of a fuel cell 210 according to a twenty-second embodiment of the present invention.

The power generation cell 212 includes a membrane electrode assembly (MEA) 214, a first metal separator 18 and a second metal separator 20 sandwiching the membrane electrode assembly 214. The membrane electrode assembly 214 includes a cathode 52, and an anode 54, and a solid polymer electrolyte membrane 50 interposed between the cathode 52 and the anode 54.

In the anode 54, the surface size of an anode side electrode catalyst layer 54b is the same as the surface size of an anode side gas diffusion layer 54a. In the cathode 52, the surface size of a cathode side electrode catalyst layer 52b is smaller than the surface size of a cathode side gas diffusion layer 52a.

A frame shaped barrier layer such as a frame shaped gas impermeable film 216 is provided at the outer portion of the cathode side gas diffusion layer 52a such that an inner end 216a of the frame shaped gas impermeable film 216 is overlapped with the cathode side gas diffusion layer 52a. The inner end 216a and the cathode side electrode catalyst layer 52b are partially overlapped with each other in the stacking direction. The outer size of the gas impermeable film 216 is the same as the outer size of the solid polymer electrolyte membrane 50. The outer size of the gas impermeable film 216 may be smaller than the outer size of the solid polymer electrolyte membrane 50, and may be terminated at a position such that it does not contact a ridge seal 47b.

In the twenty-second embodiment, the same advantages as in the cases of the fourth and the subsequent embodiments are obtained.

Figure 27:
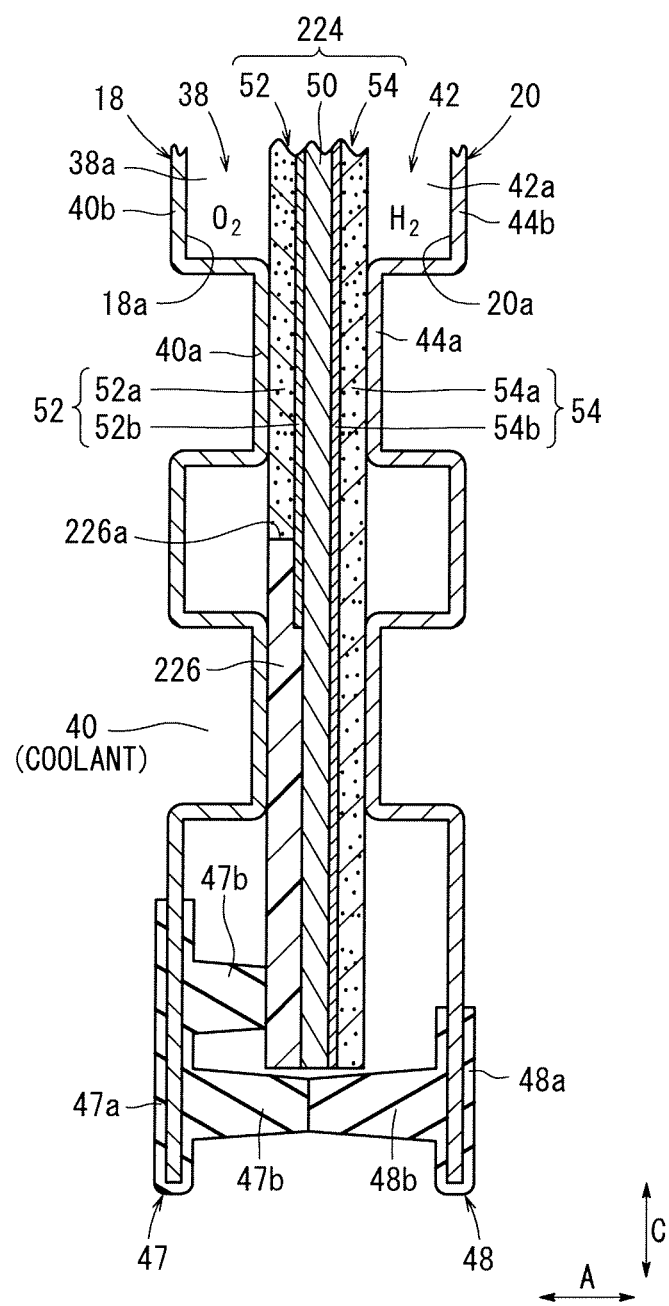
FIG. 27 is a cross sectional view showing main components of a power generation cell according to a twenty-third embodiment of the present invention.

FIG. 27 is a cross sectional view showing a power generation cell 222 of a fuel cell 220 according to a twenty-third embodiment of the present invention. The fuel cell 220 has substantially the same structure as the fuel cell 130 according to the fourteenth embodiment.

The power generation cell 222 includes a membrane electrode assembly (MEA) 224, a first metal separator 18 and a second metal separator 20 sandwiching the membrane electrode assembly 224. The membrane electrode assembly 224 includes a cathode 52, and an anode 54, and a solid polymer electrolyte membrane 50 interposed between the cathode 52 and the anode 54.

The surface size of the cathode 52 is smaller than the surface size of the anode 54, and the surface size of a cathode side electrode catalyst layer 52b is larger than the surface size of a cathode side gas diffusion layer 52a. A gas impermeable film 226 is provided at the outer end of the solid polymer electrolyte membrane 50. The surface size of the gas impermeable film 226 is the same as the surface size of the solid polymer electrolyte membrane 50. An inner end 226a of the gas impermeable film 226 has a portion overlapped with the cathode side electrode catalyst layer 52b, and the inner end 226a is joined to the outer portion of the cathode side gas diffusion layer 52a in a stepwise manner.

In the twenty-third embodiment, the gas impermeable film 226 is provided. Thus, the same advantages as in the case of, in particular, the fourteenth embodiment are obtained.

Figure 28:
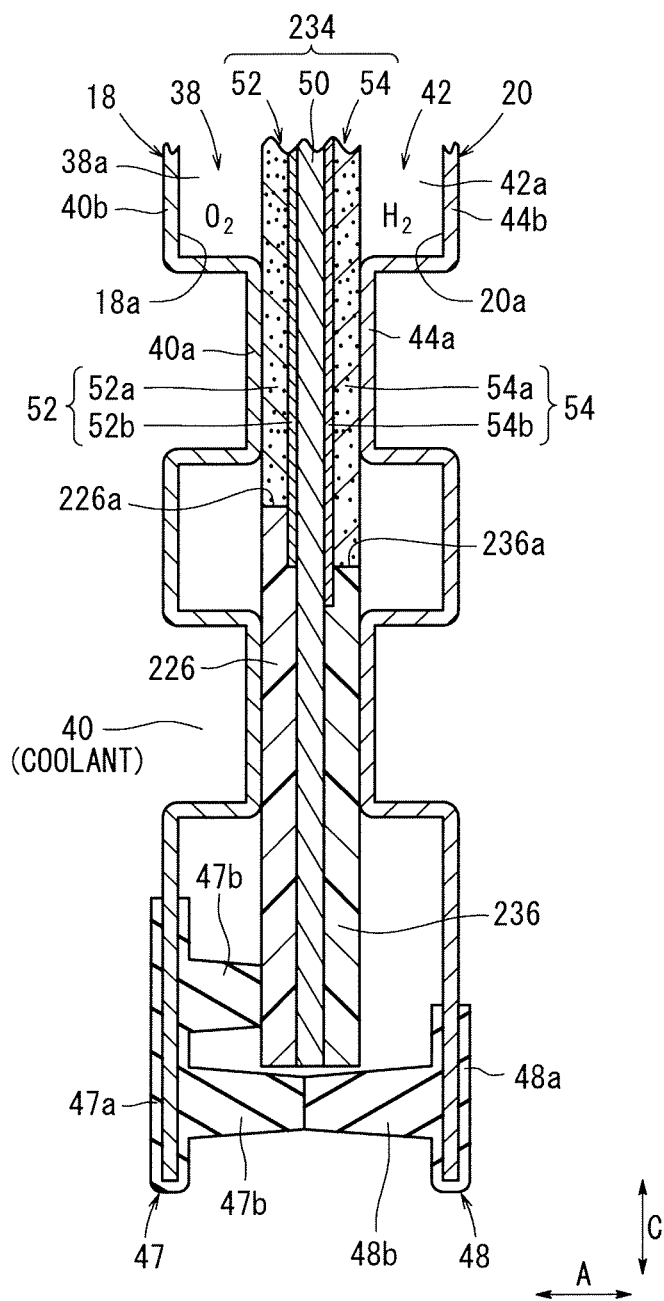
FIG. 28 is a cross sectional view showing main components of a power generation cell according to a twenty-fourth embodiment of the present invention.

FIG. 28 is a cross sectional view showing main components of a power generation cell 232 of a fuel cell 230 according to twenty-fourth embodiment of the present invention. The fuel cell 230 has the same structure as the fuel cell 140 according to the fifteenth embodiment.

The power generation cell 232 includes a membrane electrode assembly (MEA) 234, a first metal separator 18 and a second metal separator 20 sandwiching the membrane electrode assembly 234. The membrane electrode assembly 234 includes a cathode 52, and an anode 54, and a solid polymer electrolyte membrane 50 interposed between the cathode 52 and the anode 54.

The cathode 52 has the same structure as that of the twenty-third embodiment. In the anode 54, the surface size of an anode side electrode catalyst layer 54b is larger than the surface size of an anode side gas diffusion layer 54a. The surface sizes of the cathode 52 and the anode 54 are smaller than the surface size of the solid polymer electrolyte membrane 50.

A gas impermeable film 236 is provided at the outer end of the solid polymer electrolyte membrane 50 extending outward beyond the outer end of the anode 54. An inner end 236a of the gas impermeable film 236 has a portion overlapped with the anode side electrode catalyst layer 54b, and is joined to the outer portion of the anode side gas diffusion layer 54a in a stepwise manner. Preferably, the outer end of the anode side electrode catalyst layer 54b of the anode 54 is provided within the area of the fuel gas flow grooves 42a. Preferably, the outer end of the cathode side electrode catalyst layer 52b of the cathode 52 is provided within the area of the oxygen-containing gas flow grooves 38a.

In the twenty-fourth embodiment, the gas impermeable films 226, 236 are provided. Thus, the same advantages as in the case of, in particular, the fifteenth embodiment are obtained.

The present invention is not limited to combinations, shapes of the above described first to twenty-fourth embodiments. Though the gas impermeable film, the resin member or the like is used as the frame shaped barrier layer, various combinations, shapes or the like can be adopted depending on the applications.

Figure 29:
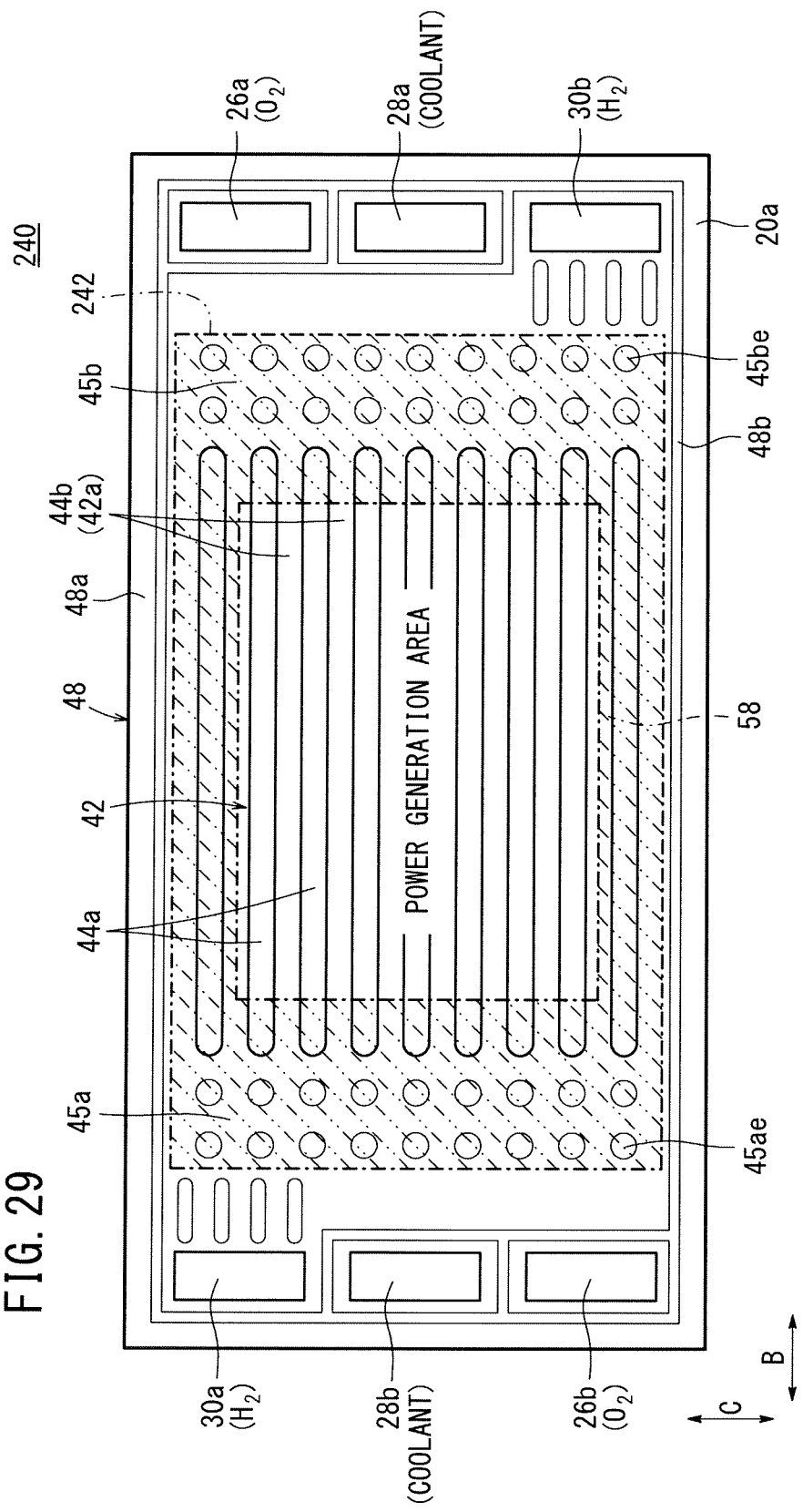
FIG. 29 is a front view showing a second metal separator of a fuel cell according to a twenty-fifth embodiment of the present invention, defining an area where a frame shaped barrier layer is provided.

FIG. 29 is a view showing a second metal separator 240 of a fuel cell according to a twenty-fifth embodiment of the present invention, defining an area where a frame shaped barrier layer is provided. In a first metal separator, the area where a frame shaped barrier layer is provided is also defined in a similar manner.

In the second metal separator 240, a frame shaped barrier layer such as a gas impermeable film and a resin member is provided in a barrier layer area 242. The barrier layer area 242 includes an area around the power generation area (area where the cathode side electrode catalyst layer 52b and the anode side electrode catalyst layer 54b are present oppositely on both sides of the solid polymer electrolyte membrane 50) and areas covering the inlet buffer 45a and the outlet buffer 45b.

The frame shaped barrier layer may be provided on a side where the cathode side electrode catalyst layer 52b is present, on a side where the anode side electrode catalyst layer 54b is present, or on both of the side where the cathode side electrode catalyst layer 52b is present and the side where the anode side electrode catalyst layer 54b is present. This is also the case with a twenty-sixth embodiment described later.

Figure 30:
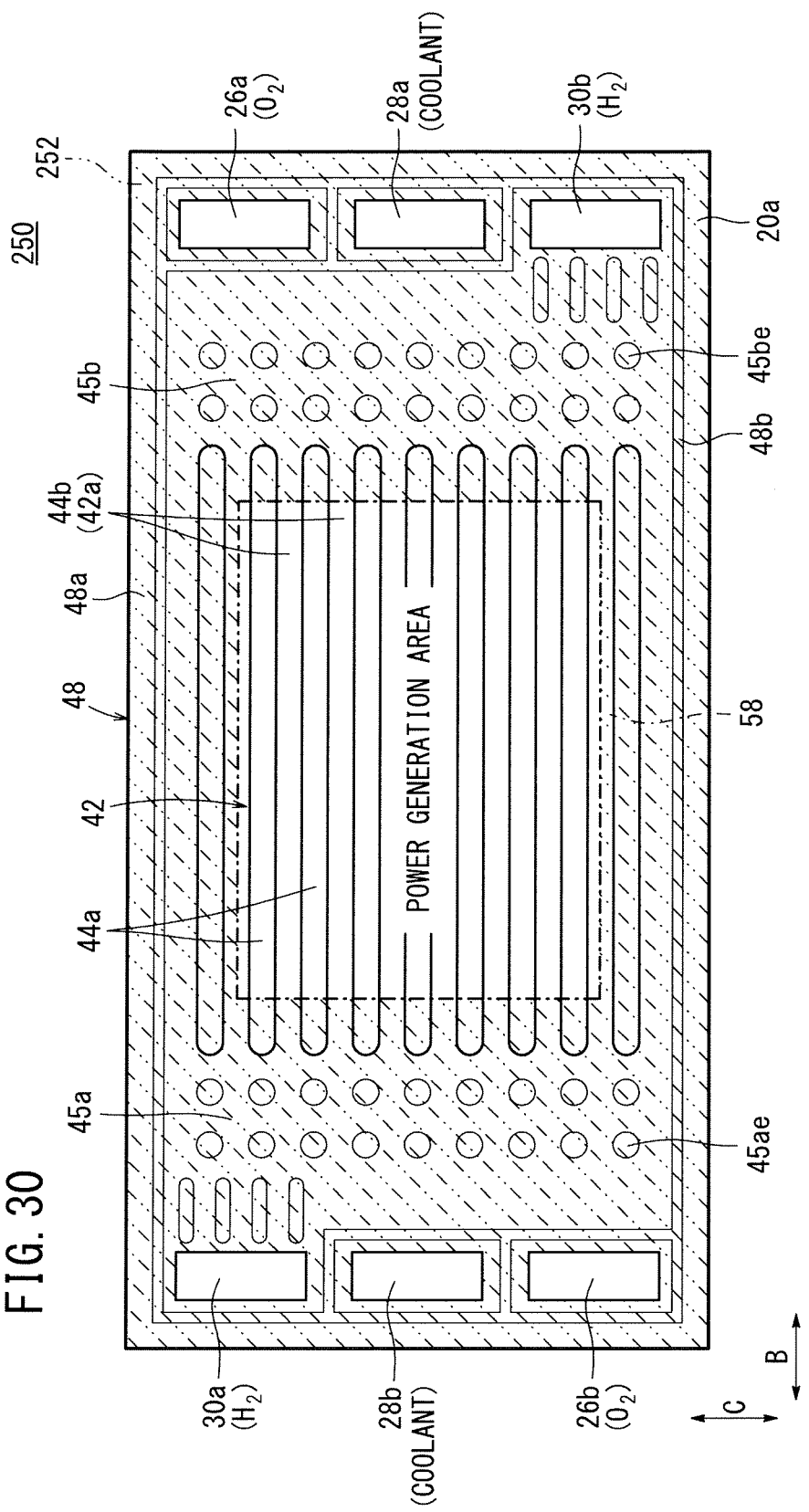
FIG. 30 is a front view showing a second metal separator of a fuel cell according to a twenty-sixth embodiment of the present invention, defining an area where a frame shaped barrier layer is provided.
Figure 31:
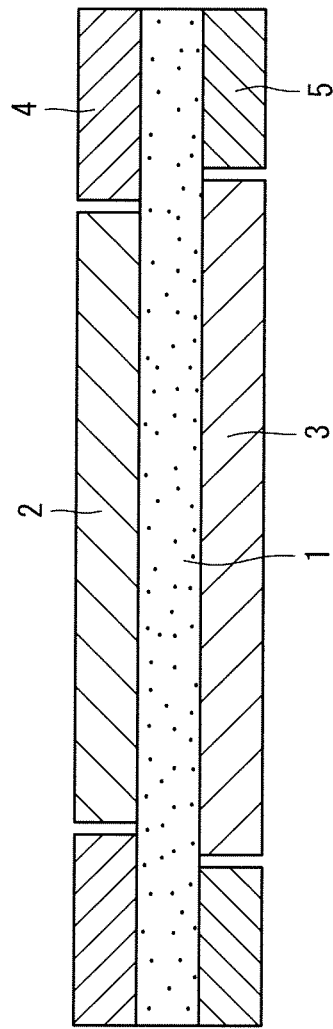
FIG. 31 is a cross sectional view showing a fuel cell disclosed in Japanese Patent No. 3242737.

FIG. 30 is a view showing a second metal separator 250 of a fuel cell according to the twenty-sixth embodiment, defining an area where the frame shaped barrier layer is provided.

In the second metal separator 250, a frame shaped barrier layer such as a gas impermeable film or a resin member is provided in a barrier layer area 252. The barrier layer area 252 is present over the entire surface of the second metal separator 250 around the power generation area. The frame shaped barrier layer is extended to the oxygen-containing gas supply passage 26a, the oxygen-containing gas discharge passage 26b, the coolant supply passage 28a, the coolant discharge passage 28b, the fuel gas supply passage 30a, and the fuel gas discharge passage 30b. It should be noted that these fluid passages may be formed in the frame shaped barrier layer.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell comprising a membrane electrode assembly and a pair of metal separators sandwiching the membrane electrode assembly, the membrane electrode assembly including a solid polymer electrolyte membrane, a first electrode provided on one surface of the solid polymer electrolyte membrane, a second electrode provided on another surface of the solid polymer electrolyte membrane, the first electrode having a first electrode catalyst layer and a first gas diffusion layer, the second electrode having a second electrode catalyst layer and a second gas diffusion layer, a surface size of the first electrode catalyst layer being smaller than a surface size of the second electrode catalyst layer, wherein a frame shaped barrier layer is provided at least around the second electrode catalyst layer or around the first electrode catalyst layer such that an inner end of the frame shaped barrier layer is overlapped with an outer portion of the second electrode catalyst layer and an outer portion of the first electrode catalyst layer when viewed along a direction in which the membrane electrode assembly and metal separators are stacked.

2. The fuel cell according to claim 1, wherein the frame shaped barrier layer is at least any one of a gas impermeable film, a resin impregnation portion, and a resin frame member.

3. The fuel cell according to claim 1, wherein the frame shaped barrier layer is provided at the outer portion of the second electrode catalyst layer.

4. The fuel cell according to claim 3, wherein the frame shaped barrier layer has a gas impermeable film interposed between the second electrode catalyst layer and the second gas diffusion layer.

5. The fuel cell according to claim 3, wherein the frame shaped barrier layer has a resin impregnation portion for impregnation of the second gas diffusion layer with resin.

6. The fuel cell according to claim 3, wherein the frame shaped barrier layer has a resin frame member provided at an outer portion of the second gas diffusion layer.

7. The fuel cell according to claim 3, wherein the frame shaped barrier layer has a gas impermeable film provided between the second gas diffusion layer and the metal separator.

8. The fuel cell according to claim 3, wherein another frame shaped barrier layer is provided at the outer portion of the first electrode catalyst layer oppositely to the frame shaped barrier layer.

9. The fuel cell according to claim 1, wherein the surface size of the first electrode catalyst layer is larger than a surface size of the first gas diffusion layer, or the surface size of the second electrode catalyst layer is larger than a surface size of the second gas diffusion layer, and the frame shaped barrier layer is provided at an outer end of the first gas diffusion layer or an outer end of the second gas diffusion layer.

10. The fuel cell according to claim 1, wherein at least an outer end of the first electrode catalyst layer or an outer end of the second electrode catalyst layer is positioned within an area of a reactant gas flow groove of a reactant gas flow field for allowing a reactant gas to flow along a power generation surface.

* * * * *